(12) United States Patent
Hoffman et al.

(10) Patent No.: US 12,085,113 B2
(45) Date of Patent: *Sep. 10, 2024

(54) WALL ANCHORS AND ASSEMBLIES FOR HEAVYWEIGHT OBJECTS

(71) Applicant: 3M INNOVATIVE PROPERTIES COMPANY, St. Paul, MN (US)

(72) Inventors: Joseph A. Hoffman, Minneapolis, MN (US); Tatiane Dias Marques Faria, Lake Elmo, MN (US); Craig D. Thompson, Inver Grove Heights, MN (US); Judd D. Olson, Deephaven, MN (US); Michele A. Eller, Stillwater, MN (US); Angela L Pan, Arden Hills, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/057,986

(22) PCT Filed: May 22, 2019

(86) PCT No.: PCT/US2019/033582
§ 371 (c)(1),
(2) Date: Nov. 23, 2020

(87) PCT Pub. No.: WO2019/226809
PCT Pub. Date: Nov. 28, 2019

(65) Prior Publication Data
US 2021/0298497 A1 Sep. 30, 2021

Related U.S. Application Data

(60) Provisional application No. 62/792,128, filed on Jan. 14, 2019, provisional application No. 62/676,458, (Continued)

(51) Int. Cl.
*F16B 45/00* (2006.01)
*A47G 1/16* (2006.01)
(Continued)

(52) U.S. Cl.
CPC ............... *F16B 45/00* (2013.01); *A47G 1/16* (2013.01); *A47G 1/1633* (2013.01); *A47G 1/20* (2013.01);
(Continued)

(58) Field of Classification Search
CPC ...... A47G 1/20; A47G 1/22; A47G 2001/207; A47G 1/1633; A47G 1/17; A47G 1/205;
(Continued)

(56) References Cited

U.S. PATENT DOCUMENTS 150,230 A * 4/1874 Dobbs et al. ............ A47G 1/16
248/495
365,725 A 6/1887 Buckland
(Continued)

FOREIGN PATENT DOCUMENTS

CH 491296 A * 5/1970 ............ F16B 45/008
CH 497882 A * 10/1970 ............... A47G 1/20
(Continued)

OTHER PUBLICATIONS

"Taper, v.", 2a, OED Online, Oxford University Press, Dec. 2022, www.oed.com/view/Entry/197668. Accessed Jan. 11, 2023.*
(Continued)

*Primary Examiner* — Taylor Morris

(57) ABSTRACT

Wall anchors and assemblies of the present disclosure include a plate, one more prongs, and a load bearing structure. The prongs are typically integral with a side edge of the plate and are typically curved in an upward towards the top edge of the plate.

18 Claims, 12 Drawing Sheets

Related U.S. Application Data filed on May 25, 2018, provisional application No. 62/675,594, filed on May 23, 2018, provisional application No. 62/675,528, filed on May 23, 2018.

(51) Int. Cl.
  *A47G 1/20* (2006.01)
  *A47G 1/17* (2006.01)
  *A47G 1/22* (2006.01)
  *F16B 15/00* (2006.01)

(52) U.S. Cl.
  CPC .................. *A47G 1/17* (2013.01); *A47G 1/22* (2013.01); *F16B 2015/0076* (2013.01)

(58) Field of Classification Search
  CPC .......... A47G 1/16; A47G 1/162; A47G 1/202; A47G 1/168; F16B 45/00; F16B 2015/0076; F16B 15/0038; F16B 15/0023; F16B 15/0015; F16B 15/00; F16B 15/0046
  USPC ....................................................... 248/216.1
  See application file for complete search history.

(56) References Cited

U.S. PATENT DOCUMENTS

| | | | |
|---|---|---|---|
| 754,323 A * | 3/1904 | Lewis .................... | A47G 1/162 24/703.1 |
| 1,185,587 A | 5/1916 | Bragg | |
| 1,306,114 A * | 6/1919 | Koval ...................... | E06B 9/50 248/267 |
| 1,651,392 A * | 12/1927 | Honigbaum ............. | A47G 1/22 52/548 |
| 1,995,173 A * | 3/1935 | Ehle .................... | E04F 13/0835 52/363 |
| 1,999,575 A * | 4/1935 | Reuter .................... | A47G 1/20 248/254 |
| 2,117,308 A * | 5/1938 | Frey .................... | F16B 15/0046 411/921 |
| 2,383,658 A * | 8/1945 | Larson .................... | A47G 1/20 248/497 |
| 2,468,190 A * | 4/1949 | Friedheim ................ | B25H 3/04 248/300 |
| 2,497,615 A * | 2/1950 | Lux .......................... | A47G 1/20 248/493 |
| 2,601,424 A * | 6/1952 | Baker .................... | A44B 6/00 24/351 |
| 2,608,386 A * | 8/1952 | Hart .................... | E04H 17/1447 248/314 |
| 2,693,927 A * | 11/1954 | Gardner ................ | A47H 1/142 248/216.1 |
| 2,723,815 A * | 11/1955 | Browning ................ | A47G 1/20 248/216.4 |
| 2,751,807 A | 6/1956 | Harre | |
| 2,877,972 A * | 3/1959 | Sutton .................. | A47G 1/1633 248/496 |
| 2,895,369 A * | 7/1959 | Andersen .................. | E04G 5/08 411/466 |
| 2,919,621 A * | 1/1960 | Langdon ............. | E04F 13/0837 52/363 |
| 3,020,602 A * | 2/1962 | Siering ............... | E04F 13/0816 52/714 |
| 3,143,030 A * | 8/1964 | Muller ................ | F16B 15/0023 411/921 |
| 3,241,795 A * | 3/1966 | Frye ...................... | F16B 47/003 248/205.5 |
| 3,261,137 A * | 7/1966 | Jureit .................... | E04B 1/49 52/363 |
| 3,298,651 A | 1/1967 | Passer | |
| 3,350,045 A * | 10/1967 | Mayers .................. | G09F 1/10 428/40.9 |
| 3,416,821 A * | 12/1968 | Benno .................. | F16B 15/0038 411/458 |
| 3,703,304 A * | 11/1972 | Losee .................. | F16B 15/0046 52/712 |
| 3,908,955 A * | 9/1975 | Frechtman ............. | A47G 1/143 248/126 |
| 3,923,278 A * | 12/1975 | Marcil ...................... | A47G 1/20 248/304 |
| 3,966,157 A | 6/1976 | Corral | |
| 3,967,524 A * | 7/1976 | Snow .................. | F16B 15/0038 411/921 |
| 4,003,538 A * | 1/1977 | Frye .......................... | A47G 1/17 24/304 |
| 4,034,512 A * | 7/1977 | Lindal ................ | F16B 15/0038 49/501 |
| 4,040,149 A | 8/1977 | Einhorn | |
| 4,050,205 A * | 9/1977 | Ligda ...................... | E04G 21/30 52/514 |
| 4,124,189 A * | 11/1978 | Einhorn .................... | A47G 1/20 248/304 |
| 4,162,056 A * | 7/1979 | Moorhead ................. | A47G 1/24 248/495 |
| 4,181,553 A * | 1/1980 | Hogg ........................ | A47G 1/17 156/247 |
| 4,258,493 A * | 3/1981 | Kettlestrings ............. | G09F 1/10 24/339 |
| 4,300,745 A | 11/1981 | Peterson | |
| 4,317,555 A * | 3/1982 | Hogg ........................ | A47G 1/17 248/467 |
| 4,325,528 A | 4/1982 | Martin | |
| 4,333,625 A | 6/1982 | Haug | |
| 4,336,884 A * | 6/1982 | Hart ........................ | A47G 1/17 206/806 |
| 4,384,648 A * | 5/1983 | Hart ...................... | A47G 1/205 206/806 |
| 4,422,608 A | 12/1983 | Hogg | |
| 4,485,995 A | 12/1984 | Hogg | |
| 4,509,713 A | 4/1985 | Hogg | |
| 4,524,506 A | 6/1985 | Wilke | |
| 4,571,866 A * | 2/1986 | Cole ...................... | A47G 1/162 248/496 |
| 4,613,108 A * | 9/1986 | Sundstrom ............... | A47G 1/20 248/216.1 |
| 4,621,473 A * | 11/1986 | Wendt ................. | E04F 13/0823 52/361 |
| 4,637,583 A | 1/1987 | Babitz | |
| 4,669,169 A * | 6/1987 | Hogg ...................... | A47H 99/00 411/908 |
| 4,728,237 A * | 3/1988 | Lorincz .................. | F16B 15/06 411/487 |
| 4,734,003 A * | 3/1988 | Smith .................. | F16B 15/0046 403/DIG. 15 |
| 4,756,498 A * | 7/1988 | Frye .................. | F16B 47/003 248/467 |
| 4,771,974 A * | 9/1988 | Carlson .................... | A47G 1/20 248/231.81 |
| 4,795,294 A * | 1/1989 | Takada ...................... | A47G 1/22 411/457 |
| 4,804,161 A * | 2/1989 | Wallo ...................... | A47G 1/164 40/757 |
| 4,871,140 A * | 10/1989 | Hoskinson ............. | A47G 1/162 248/216.1 |
| 5,018,697 A * | 5/1991 | Treanor .................... | A47G 1/20 248/489 |
| 5,048,788 A * | 9/1991 | Lorincz ................. | F16B 15/003 248/496 |
| 5,267,718 A * | 12/1993 | Sheehan .................... | A47G 1/22 248/217.3 |
| 5,267,719 A | 12/1993 | Keller | |
| 5,269,485 A | 12/1993 | Dwinell | |
| 5,328,139 A * | 7/1994 | Barnes .................... | A47G 1/22 248/475.1 |
| 5,356,102 A * | 10/1994 | Blumenaus ............... | A47G 1/17 248/205.5 |
| 5,390,889 A * | 2/1995 | Hiscock .............. | G09F 15/0018 24/67 CF |

(56) References Cited

U.S. PATENT DOCUMENTS

| | | | |
|---|---|---|---|
| 5,437,428 A * | 8/1995 | Mirza | A47G 1/17 |
| | | | 40/594 |
| 5,437,429 A * | 8/1995 | Atlas | A47G 1/20 |
| | | | 248/493 |
| 5,516,581 A | 5/1996 | Kreckel | |
| 5,588,629 A * | 12/1996 | Barnes | A47G 1/16 |
| | | | 248/475.1 |
| 5,878,988 A * | 3/1999 | Rakower | A47G 1/20 |
| | | | 248/497 |
| 6,095,465 A | 8/2000 | Weck | |
| 6,106,937 A | 8/2000 | Hamerski | |
| 6,126,126 A | 10/2000 | McKiernan, Jr. | |
| 6,206,334 B1 | 3/2001 | Weck | |
| 6,231,962 B1 | 5/2001 | Bries | |
| 6,371,427 B1 * | 4/2002 | Johnson | A47G 1/20 |
| | | | 248/218.2 |
| 6,395,389 B1 | 5/2002 | Lühmann | |
| 6,431,510 B1 | 8/2002 | Lydecker | |
| 6,471,169 B1 * | 10/2002 | Maloney | A47G 1/17 |
| | | | 248/205.3 |
| 6,478,273 B1 | 11/2002 | McKiernan, Jr. | |
| 6,830,228 B2 * | 12/2004 | Ernst | A47G 1/20 |
| | | | 248/475.1 |
| 6,952,887 B2 * | 10/2005 | Muchnik | B25H 7/045 |
| | | | 33/645 |
| 7,024,811 B1 * | 4/2006 | Cole | G09F 7/04 |
| | | | 40/711 |
| 7,065,839 B2 * | 6/2006 | Just | B42F 1/06 |
| | | | 116/234 |
| 7,078,093 B2 | 7/2006 | Sheridan | |
| 7,290,743 B2 * | 11/2007 | Nowack | A47G 1/22 |
| | | | 248/217.1 |
| 7,293,925 B1 * | 11/2007 | Sansevero | B43K 23/08 |
| | | | 401/98 |
| 7,380,346 B1 * | 6/2008 | Emerson | A47G 1/205 |
| | | | 248/475.1 |
| 7,398,623 B2 * | 7/2008 | Martel | E04B 5/12 |
| | | | 411/461 |
| 7,431,258 B2 * | 10/2008 | Lamotta | A47G 1/20 |
| | | | 248/301 |
| 7,497,028 B2 | 3/2009 | Nevers | |
| 7,556,235 B1 * | 7/2009 | Farris | A47G 1/162 |
| | | | 248/468 |
| 7,836,604 B2 | 11/2010 | Paharik | |
| 7,946,051 B1 * | 5/2011 | Hannah | A47G 1/205 |
| | | | 33/528 |
| 7,958,648 B1 * | 6/2011 | MacConnell | B25H 7/045 |
| | | | 33/666 |
| 8,205,394 B1 * | 6/2012 | Jackman | A47K 3/16 |
| | | | 52/741.1 |
| 8,414,239 B2 * | 4/2013 | McDuff | F16B 15/00 |
| | | | 411/487 |
| 8,615,894 B1 * | 12/2013 | Schoenebeck | B25H 7/04 |
| | | | 33/666 |
| 8,633,404 B2 * | 1/2014 | Korcz | H02G 3/386 |
| | | | 174/56 |
| 8,667,765 B1 * | 3/2014 | McCarthy | E04F 13/0841 |
| | | | 52/745.1 |
| 8,740,171 B2 | 6/2014 | Crescenzo | |
| 9,095,976 B1 * | 8/2015 | Schoenebeck | B25H 7/00 |
| 9,101,236 B1 * | 8/2015 | Vayntraub | A47G 1/168 |
| 9,261,229 B2 | 2/2016 | Callif | |
| 9,775,450 B2 * | 10/2017 | Will | F16B 15/0023 |
| 10,197,217 B2 * | 2/2019 | Will | A47G 1/1633 |
| 10,454,190 B1 * | 10/2019 | Martin | H02S 30/00 |
| 10,539,266 B2 * | 1/2020 | Will | F16M 13/02 |
| 10,687,639 B2 * | 6/2020 | Kan | B43M 15/00 |
| 10,895,099 B2 * | 1/2021 | Vos | E04F 13/0837 |
| D942,844 S * | 2/2022 | Davenport | D8/371 |
| 2002/0066200 A1 | 6/2002 | Lombardo | A47G 1/205 |
| | | | 33/666 |
| 2003/0066941 A1 * | 4/2003 | Beaty | A47G 1/20 |
| | | | 248/475.1 |
| 2003/0127578 A1 * | 7/2003 | Skorka | A47G 1/20 |
| | | | 248/475.1 |
| 2003/0178545 A1 | 9/2003 | Ernst | |
| 2004/0065027 A1 | 4/2004 | Birss | |
| 2004/0084597 A1 * | 5/2004 | Hamerski | A47G 1/20 |
| | | | 248/452 |
| 2004/0101673 A1 * | 5/2004 | Schoppman | C09J 7/22 |
| | | | 428/354 |
| 2005/0006552 A1 * | 1/2005 | Giles | G09F 7/06 |
| | | | 248/467 |
| 2005/0252156 A1 * | 11/2005 | Martel | E04B 5/12 |
| | | | 52/714 |
| 2006/0182517 A1 | 8/2006 | McDuff | |
| 2007/0124910 A1 * | 6/2007 | Peterson | A47G 1/20 |
| | | | 29/432 |
| 2007/0194202 A1 * | 8/2007 | Lamotta | A47G 1/20 |
| | | | 248/475.1 |
| 2007/0235622 A1 * | 10/2007 | Baran | A47H 1/102 |
| | | | 248/546 |
| 2007/0257168 A1 * | 11/2007 | Friedrichs | A47G 1/1606 |
| | | | 248/217.3 |
| 2007/0283588 A1 * | 12/2007 | Gardner | F16B 15/02 |
| | | | 33/666 |
| 2007/0295879 A1 * | 12/2007 | Wong | A47G 1/20 |
| | | | 248/475.1 |
| 2008/0296456 A1 | 12/2008 | Lien | |
| 2010/0084539 A1 * | 4/2010 | Popkin | A47G 1/1626 |
| | | | 248/475.1 |
| 2011/0012006 A1 | 1/2011 | Serio | |
| 2012/0056051 A1 | 3/2012 | Gold | |
| 2012/0145847 A1 * | 6/2012 | Wang | A47G 1/17 |
| | | | 248/205.3 |
| 2014/0231604 A1 | 8/2014 | Long | |
| 2014/0306076 A1 * | 10/2014 | Friesch | A47G 33/105 |
| | | | 248/205.3 |
| 2014/0326848 A1 * | 11/2014 | Popkin | A47G 1/1613 |
| | | | 248/475.1 |
| 2015/0034104 A1 | 2/2015 | Zhou | |
| 2015/0201764 A1 * | 7/2015 | Sato | A47G 1/20 |
| | | | 248/205.3 |
| 2015/0308613 A1 * | 10/2015 | Callif | F16M 13/02 |
| | | | 248/216.1 |
| 2016/0068722 A1 | 3/2016 | Schmitz-Stapela | |
| 2016/0230792 A1 * | 8/2016 | Arbesman | F16B 15/0046 |
| 2017/0000270 A1 | 1/2017 | Will | |
| 2017/0002973 A1 | 1/2017 | Will | |
| 2017/0002974 A1 | 1/2017 | Will | |
| 2017/0037892 A1 * | 2/2017 | Higgins | B21D 53/46 |
| 2017/0112281 A1 | 4/2017 | Malott | |
| 2017/0143121 A1 * | 5/2017 | Grice | F16B 15/0015 |
| 2017/0265659 A1 * | 9/2017 | Ward | A47G 1/06 |
| 2018/0228305 A1 * | 8/2018 | Fastermann | A47G 1/175 |
| 2018/0317672 A1 * | 11/2018 | Taratuta | F16B 1/00 |
| 2019/0021524 A1 * | 1/2019 | Yang | A47G 1/205 |
| 2021/0137289 A1 * | 5/2021 | Ward | A47G 1/1633 |
| 2021/0169241 A1 * | 6/2021 | Hamel | A47G 1/202 |
| 2021/0239145 A1 * | 8/2021 | Erekson | E04D 13/1476 |
| 2021/0345808 A1 * | 11/2021 | Berman | F16B 13/04 |
| 2022/0279945 A1 * | 9/2022 | Hoffman | F16M 13/02 |

FOREIGN PATENT DOCUMENTS

| | | | |
|---|---|---|---|
| EP | 1346675 | 9/2003 | |
| GB | 391791 A * | 4/1933 | A47G 1/20 |
| GB | 2033038 A * | 5/1980 | E04B 1/49 |
| JP | 2016-023689 A | 2/2016 | |
| WO | WO 2015-035556 | 3/2015 | |
| WO | WO 2015-035960 | 3/2015 | |
| WO | WO 2016-160364 | 10/2016 | |
| WO | WO 2016-200769 | 12/2016 | |
| WO | WO 2017-136188 | 8/2017 | |
| WO | WO 2017-136219 | 8/2017 | |
| WO | WO-2018218024 A1 * | 11/2018 | F16B 37/048 |
| WO | WO 2019-226816 | 11/2019 | |

(56) References Cited

FOREIGN PATENT DOCUMENTS

| WO | WO-2021038389 A1 | * | 3/2021 | ........... A47G 1/1633 |
| WO | WO-2022074511 A1 | * | 4/2022 | ............... A47G 1/16 |

OTHER PUBLICATIONS

"Encyclopedia of Polymer Science and Engineering", Interscience Publishers, 1988, vol. 13, pp. 1-3.
"Encyclopedia of Polymer Science and Technology", Interscience Publishers, 1964, vol. 01, pp. 1-24.
International Search Report for PCT International Application No. PCT/US2019/033582, mailed on Aug. 14, 2019, 7 pages.

* cited by examiner

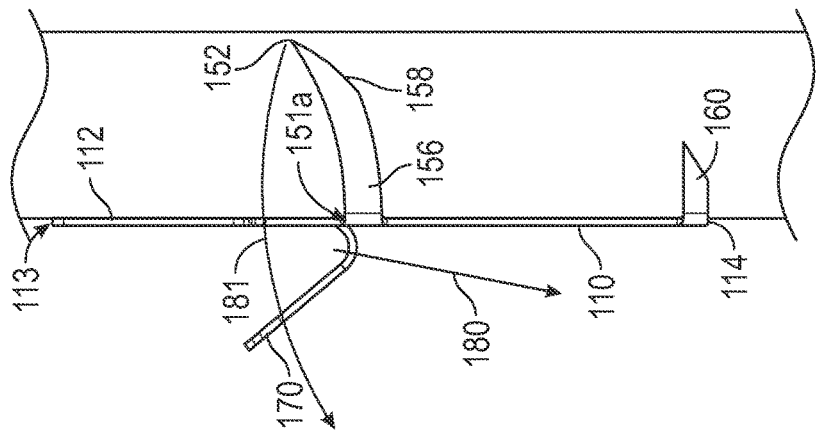
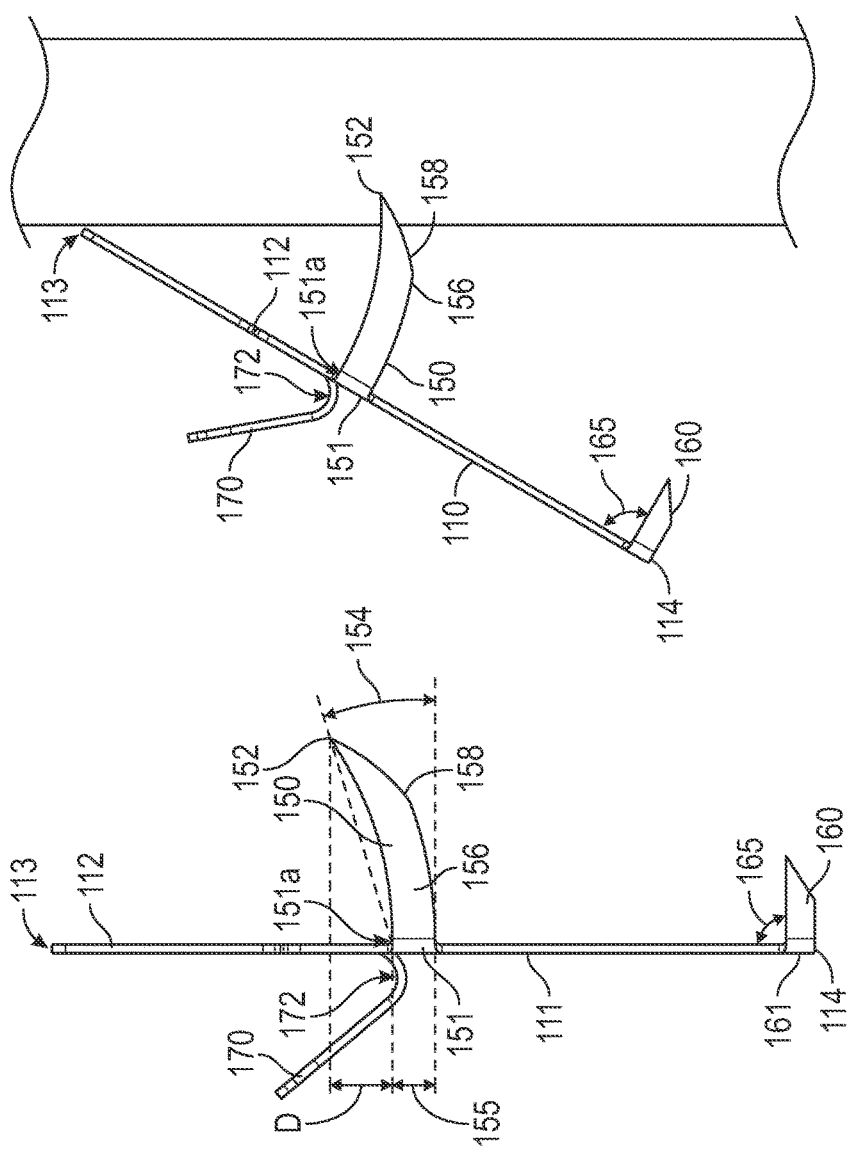
FIG. 3
FIG. 4

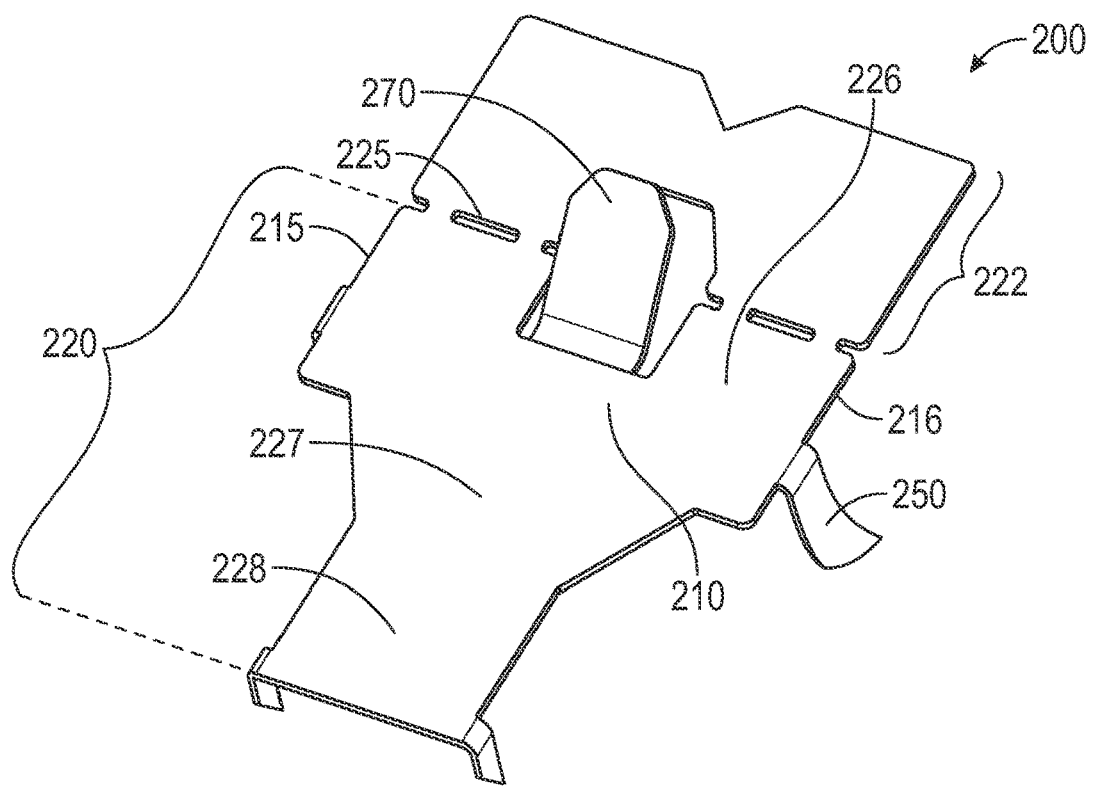
FIG. 5
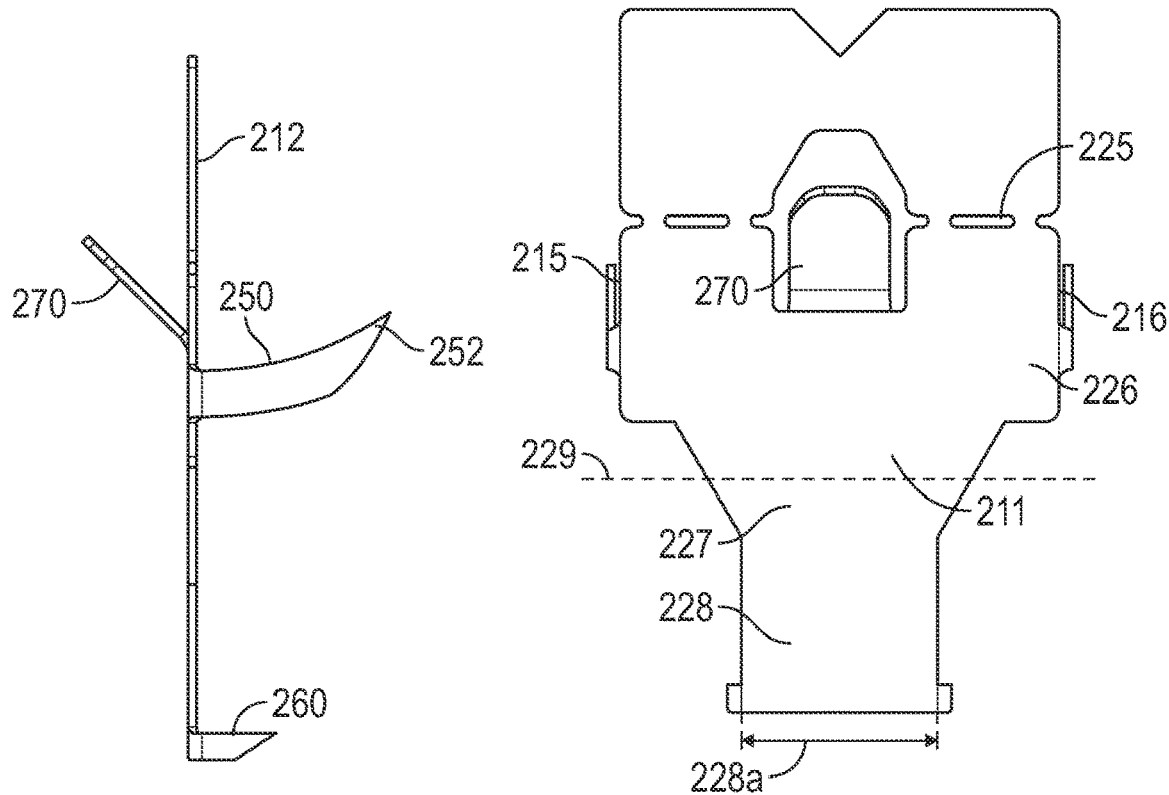
FIG. 6
FIG. 7

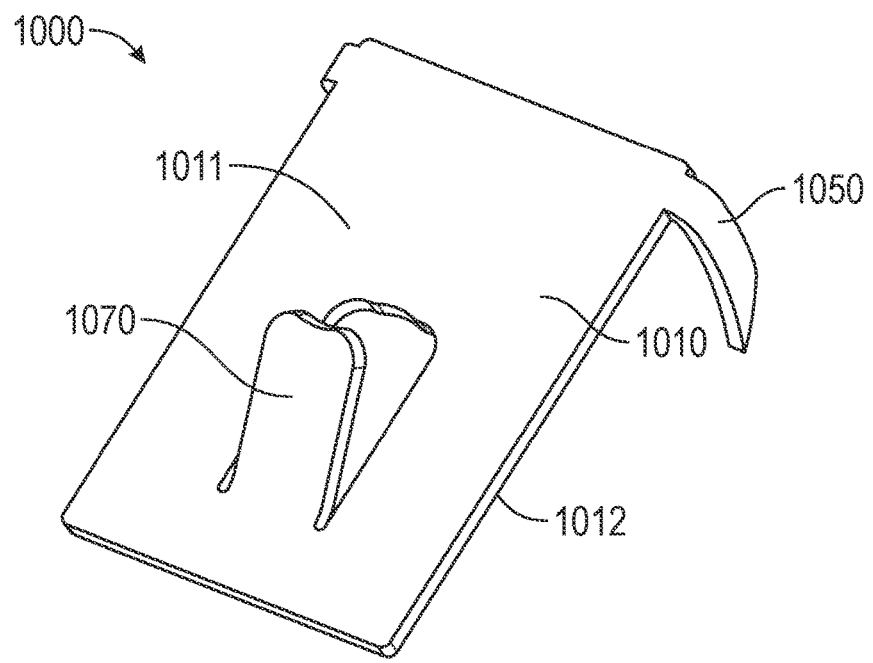
FIG. 20
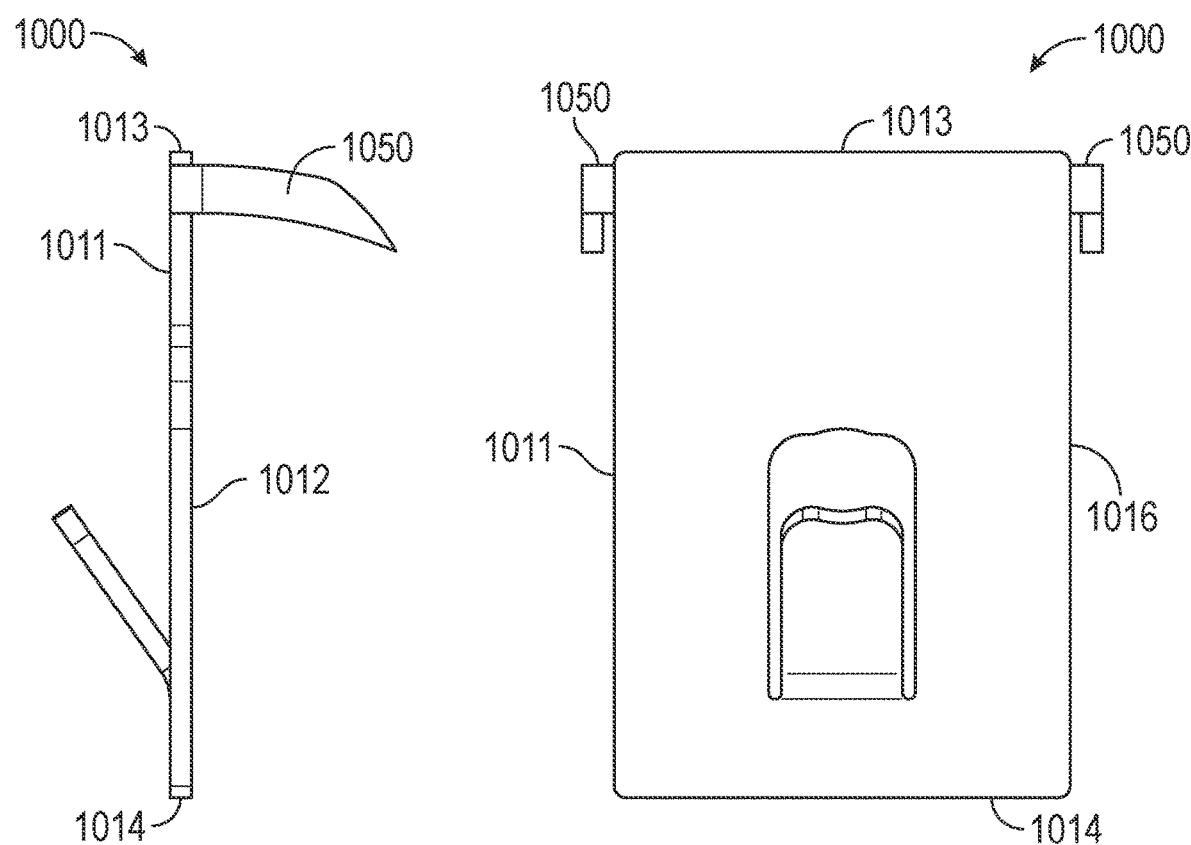
FIG. 21
FIG. 22

WALL ANCHORS AND ASSEMBLIES FOR HEAVYWEIGHT OBJECTS

CROSS REFERENCE TO RELATED APPLICATIONS

This application is a national stage filing under 35 U.S.C. 371 of PCT/US2019/033582, filed May 22, 2019, which claims the benefit of provisional Application No. 62/792,128, filed Jan. 14, 2019, and also claims the benefit of provisional Application No. 62/676,458, filed May 25, 2018, and also claims the benefit of provisional Application No. 62/675,528, filed May 23, 2018, and also claims the benefit of provisional Application No. 62/675,594, filed May 23, 2018, the disclosure of which is incorporated by reference in its/their entirety herein.

BACKGROUND

Numerous products and devices exist for installing a hook or hanging device in a wall, such as for hanging a picture frame, a mirror, or the like. Conventional nails and screws are not always convenient solutions and may not provide sufficient support strength in the wall, particularly in the case of drywall, or other friable wallboards, which are relatively weak. Other hanging devices may avoid the use and attendant drawbacks of conventional fasteners, but nonetheless may result in excessive damage to the wallboard, require the use of conventional tools, or fail to consistently hold the desired weight.

SUMMARY

The present inventors have devised a wall anchor construction and wall anchor assemblies that provide stronger support in load bearing directions than currently available solutions. The wall anchors and anchor assemblies may be installed without the use of tools and may be used to mount heavy weight objects like picture frames without damaging the wall or losing material fidelity. The anchors feature a base plate and one or more prongs that include a relatively high ratio of height to thickness, which can provide both an improved installation experience and more routinely successful mounting. The anchors may be combined with other components that allow for temporary attachment of an anchor assembly to the wall, letting a user iteratively select the best location for both the anchor and the object to be mounted without fully committing to the installation.

In one aspect, the present disclosure provides a wall anchor comprising: a base plate including opposing front and back surfaces, a top edge, a bottom edge and two opposing side edges: and a curved prong having a base, wherein the prong extends outwardly along an arc to a wall-penetrating outer end, and wherein the base of the prong is integral with one of the opposing side edges.

In another aspect, the present disclosure provides a wall anchor assembly comprising: a base plate a first insertion plate pivotally coupled to the base plate and including a proximal edge, a distal edge, and opposing side edges, the insertion plate further including a curved prong having a base, wherein the prong extends outwardly along an arc to a wall-penetrating outer end, and wherein the base of the prong is coincident with one of the opposing side edges. Such wall anchor assemblies may further comprise a second insertion plate pivotally coupled to the base plate and including a proximal edge, a distal edge, and opposing side edges. The second insertion plate can further include a second curved prong having a base, wherein the prong extends outwardly along an arc to a wall-penetrating outer end, and wherein the base of the prong is coincident with one of the opposing side edges of the second insertion plate.

As used herein. "layer" means a single stratum that may be continuous or discontinuous over a surface.

As used herein "geometry" refers to the size and shape of an element.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a". "an", and "the" are not intended to refer to only a singular entity, but include the general class of which a specific example may be used for illustration. The terms "a". "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The disclosure will be further described with reference to the drawings, wherein corresponding reference characters indicate corresponding parts throughout the several views, and wherein:

FIG. 3 is a side-view of the wall anchor of FIGS. 1-2;

FIG. 4 is a side-view of the wall anchor of FIGS. 1-3 during and after insertion into a wall;

FIG. 5 illustrates a perspective view of a wall anchor assembly, according to another embodiment of the present disclosure;

FIG. 6 is a side-view of the wall anchor of FIG. 5;

FIG. 7 is a front planar view of the wall anchor of FIGS. 5-6;

FIG. 20 is a front, perspective view of a wall anchor according to another embodiment of the present disclosure;

FIG. 21 is a side-view of the wall anchor of FIG. 20;

FIG. 22 is a front plan view of the wall anchor of FIGS. 20 and 21;

Layers in certain depicted embodiments are for illustrative purposes only and are not intended to absolutely define the thickness, relative or otherwise, or the absolute location of any component. While the above-identified figures set forth several embodiments of the disclosure other embodiments are also contemplated, as noted in the description. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION OF ILLUSTRATIVE EMBODIMENTS

While the above-identified figures set forth several embodiments of the disclosure other embodiments are also contemplated, as noted in the description. In all cases, this disclosure presents the invention by way of representation and not limitation. It should be understood that numerous other modifications and embodiments can be devised by those skilled in the art, which fall within the scope and spirit of the principles of the invention.

Figure 1:
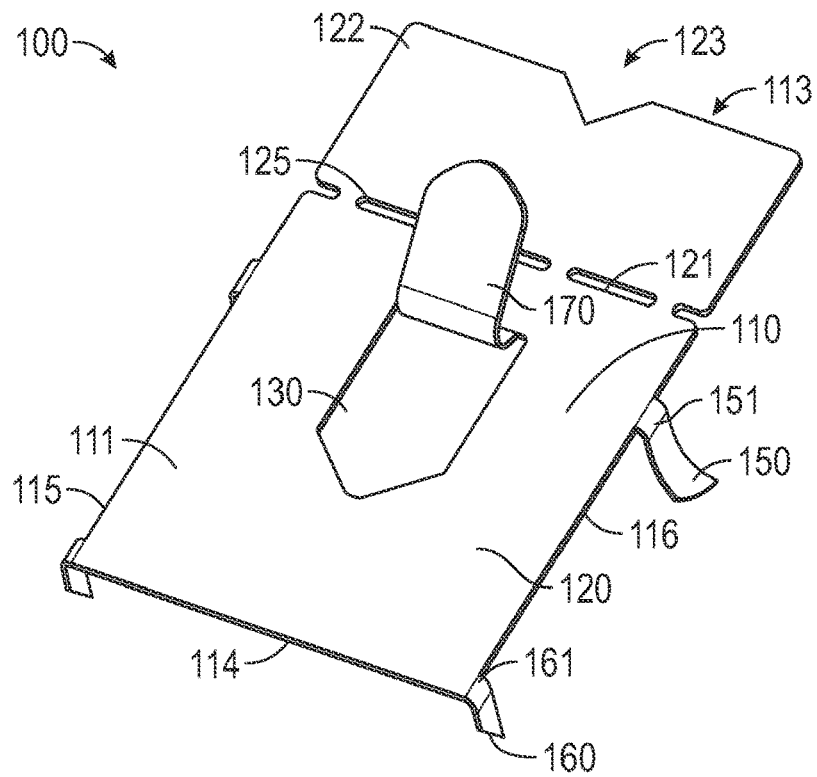
FIG. 1 illustrates a perspective view of a wall anchor, according to one embodiment of the present disclosure.
Figure 2:
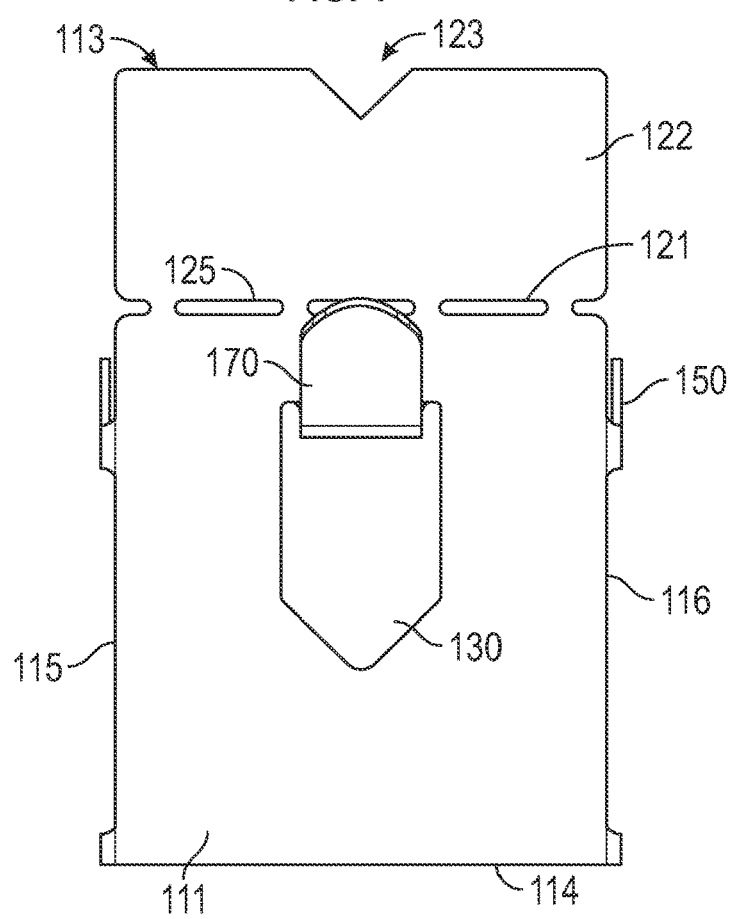
FIG. 2 is a front planar view of the wall anchor of FIG. 1.
Figure 8:
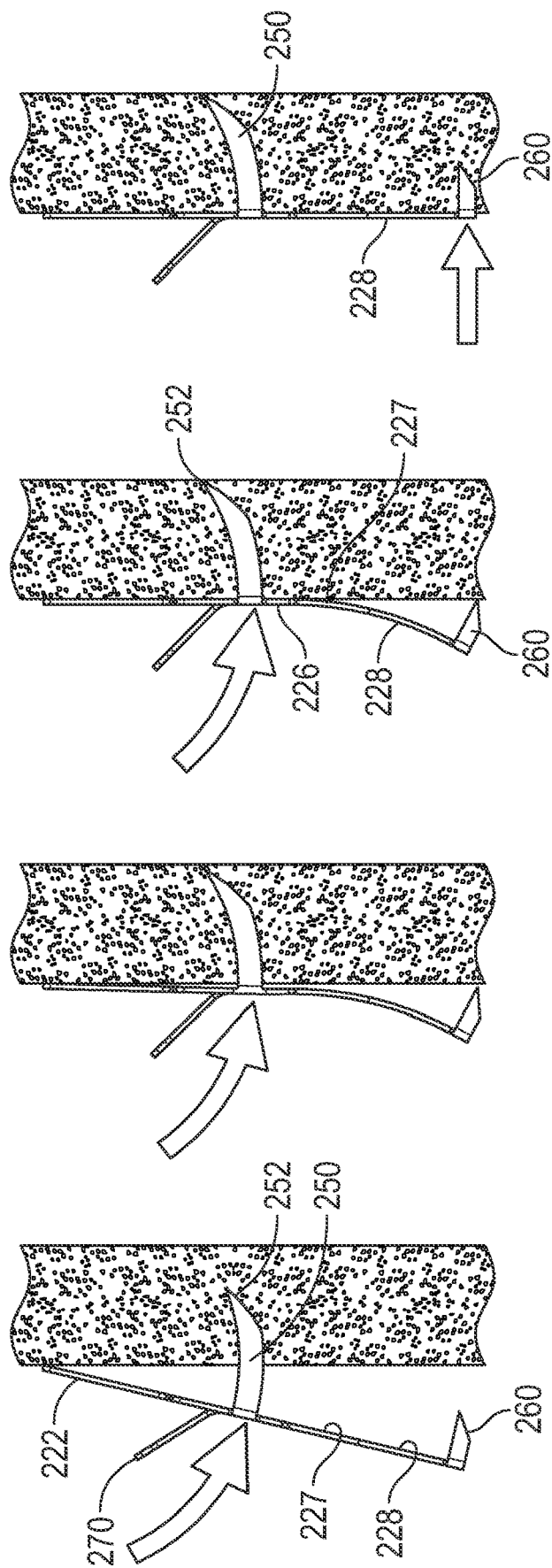
FIG. 8 is a side-view of the wall anchor of FIGS. 5-7 during and after insertion into a wall.
Figure 9:
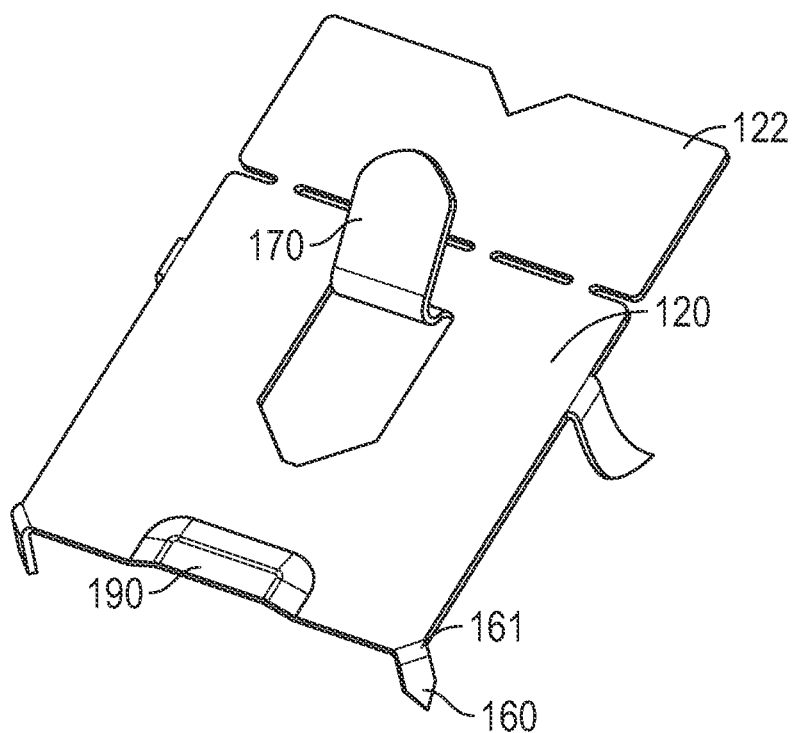
FIG. 9 illustrates a perspective view of a wall anchor, according to another embodiment of the present disclosure.
Figure 10:
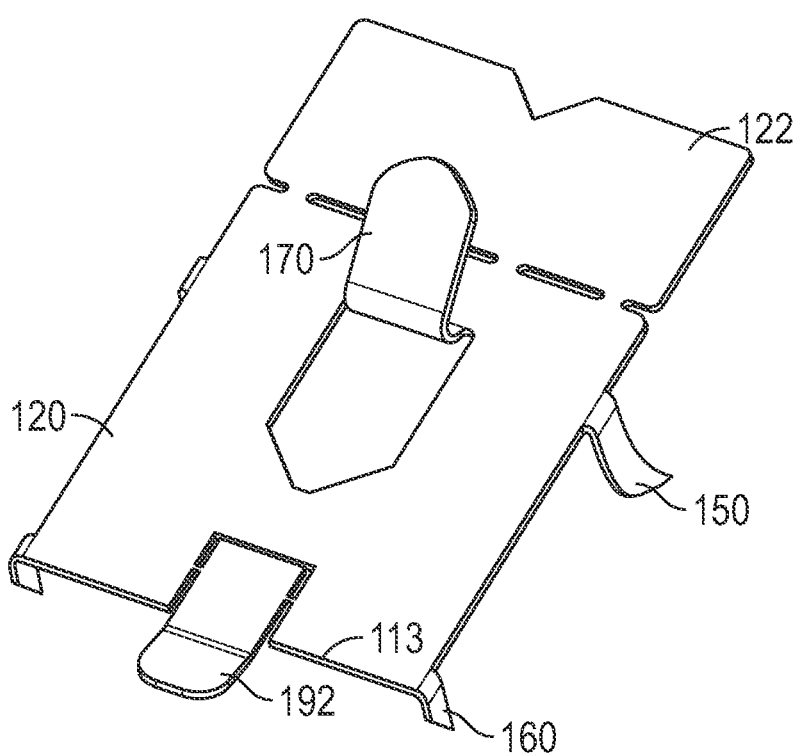
FIG. 10 illustrates a perspective view of a wall anchor, according to another embodiment of the present disclosure.

A wall anchor 100 according to one embodiment of the present disclosure is depicted in FIGS. 1-4 and 9-10. The wall anchor 100 includes a base plate 110 presenting a generally rectangular shape (as seen in FIG. 2). The base plate 110 includes a front surface 111 opposing a back, wall-facing surface 112, a top edge 113, a bottom edge 114, and opposing side edges 115, 116 connecting the top and bottom edges 113, 114 to define an outer plate perimeter. A pair of upwardly curved prongs 150 extend from each side edge 115, 116 (see FIG. 3) in direction generally orthogonal to the back surface 112. The prongs 150 extend to an outer end 152 that can be tapered to ease insertion when pressed into wall board.

The base 110 includes a lower section 120 including bottom edge 114 and an upper section 122 near the top edge 113. The sections 120 and 122 are typically coplanar and include front surfaces residing in a plane "P". The lower section 120 includes an open-ended region or recess 130 arranged generally aligned with the central axis of the base plate. The recess 130 generally corresponds in at least the width dimension to the width of a load bearing structure 170. The base plate 110 has an overall, generally rectangular shape when viewed in a plane perpendicular to the base plate plane "P". In other embodiments, the base plate 110 present another shape or combination of shapes in the same viewing direction, including circular, ovular, triangular tetrahedral. Y-shaped, etc. Other variations are contemplated and discernable by those of skill in the art.

The upper base section 122 includes an alignment notch 123 near the top edge 113 for visual confirmation of the anchor 100 placement and orientation on a wall surface. Other embodiments not depicted can feature an alignment notch of some or all of edges 114, 115, and 116. The upper section 122 is removably coupled to the lower section 120 through line of weakness 127. The line of weakness 127 may comprise perforations, recesses, apertures, combinations thereof, and other features capable of selectively reducing the structural integrity of a material. The line of weakness 127 allows the upper section 122 to be removed from the base plate 110 before or after the anchor 100 is secured to a wall surface, providing unfettered access to the load bearing structure 170. The upper section 122 may also be articulated about the line of weakness to improve the strength of the base plate 110 between the prongs 160. The presence of upper section 122 before insertion may enhance rotational forces available to the user during installation, due in part to the increased height (e.g., the distance between top edge 113 and bottom edge 114) of the base plate 110.

The lower base section 120 includes a pair of curved prongs 150 proximate the top edge 121 and a pair of linear shanks 160 adjacent the bottom edge 114. The prongs 150 and shanks 160 each extend to an outer end 152, 162 over a length that is generally equal to or less than the thickness of the wallboard to which the anchor would typically be attached. The lengths of both the prongs 150 and shanks 160 can be varied to allow selection for a specific thickness of wallboard, with the curved prongs 150 typically having linear or arc length that is at least twice that of the shanks 160. Exemplary anchor 100 may also be useful without shanks 160, but the plurality of insertion points can improve the stability of the anchor 100 during installation, use, and removal.

The curved prong 150 can have a fixed radius of curvature, or have varying radii of curvature at various points, either discretely or continuous, along the outer profile of the prong 150 from the wall-base 151 to the outer end 152. The curvature produces a tip distance "D" from the top edge 151a of the prong base 151 to a plane parallel to the outer end 152, with greater curvature producing a greater tip distance D. While not wishing to be bound by theory or relation to gypsum wallboard, it is believed that an increase in tip distance leads to an increase in the weight that may be mounted on the anchor 100. In one exemplary embodiment, the tip distance D is about 0.15 inches. In depicted implementations, the prongs 150 are upwardly curved, in that the end 152 is closer than the top edge 151a to a plane including the top edge 113 of the base plate 110. In other circumstances (See FIGS. 20-22), one or more prongs may in include a downward curve, in that the end 152 is closer than the bottom edge 151b to a plane including the bottom edge 114 of the base plate 110.

The prongs 150 may include one or more flat surfaces and may comprise different cross-sectional shapes and combination of shapes (e.g., rectangular, circular, ovular, triangular etc.). For instance, an upper surface of a prong may be rounded, with a planar bottom surface to prevent crack propagation in the wallboard. The flat surface can also aid in the prevention of pullout due to stress concentrations on the wallboard. In the embodiment depicted in FIGS. 1-4, each prong 150 includes opposing, substantially planar side surfaces 156, each side surface extending in a plane generally orthogonal to the base plane "P". In other implementations, one or both edges 158 of the prong may be serrated.

Each of the prongs 150 include a height 155 and a thickness at the base 151. The thickness is measured in a direction parallel to the top edge 113 (e.g., the x-direction) and corresponds to the distance between prong side surfaces 156. A comparison of height 155 to thickness defines a prong aspect ratio. In presently preferred implementations, the aspect ratio is at least 3:1, at least 4:1: at least 5:1. In one exemplary embodiment, the height 155 can be about 0.10 inches and the thickness can be about 0.022 inches, resulting in a prong aspect ratio of 4.55:1. As further described below, the relatively thin nature of the prongs 150 reduces the needed insertion force, while the wallboard itself serves to prevent the buckling of the prong 150 as it is inserted. Relying on the wall to prevent buckling allows for the anchor to hold progressive heavier objects. The curved prongs 150 can taper in height over all or a portion of the arc length from base 151 to end 152.

Without wishing to be bound by theory, the prong aspect ratio can change the failure mode of the anchor by enhancing the strength of the prong in load-bearing directions (e.g., towards the bottom edge 114). The enhanced strength acts against the bending on the prong while the mounting of progressively heavier objects, potentially resulting in the destruction of the wallboard before the prong yields. A relatively high aspect ratio prong can accordingly perform to user expectations for more typical mounting hardware (e.g., nails, screws, etc.) while still reducing the work needed to install.

The shank 160 forms an angle 165 with the back surface 112 of the base. By way of example, angle 165 (e.g., taken relative to a plane parallel to the frame plane "P") may be between about 75 degrees and about 90 degrees (such as between about 80 degrees and about 90 degrees or between about 85 degrees and about 90 degrees), though variations are possible. In presently preferred implementations, the shanks 160 extend generally along a plane that is substantially orthogonal to the frame plane "P". Without wishing to be bound by theory, providing an excessively acute angle between a shank 160 and the back surface 112 tends to shear gypsum wall board. A slightly acute angle (e.g., an angle 165 of 80 degrees or greater), however, may case insertion of the anchor 100 and assist in drawing the back surface 112 substantially parallel to the wall in certain embodiments. A shank may also be oriented at tilt, such that the shank base 161 is not parallel to either the lower edge 114 or a side edge 115, 116 (see FIG. 9). The shank base 161 can also be oriented at least one of parallel to and integral with lower edge 114. The shank base 161 can also be oriented at least one of parallel to and integral with lower edge 114. Such orientations may, under certain circumstances, improve the shear holding power of the anchor.

In the illustrated embodiment, and as can be seen particularly clearly from FIGS. 1, 3, and 4, the prongs 150) and shanks 160 can be formed from a monolithic piece of material that has been bent or otherwise articulated at select locations to form both base plate section 120, prongs 150, and shanks 160). Thus, each of the prongs 150) and shanks 160 include at least one section that is integral and substantially coplanar with a side edge 115, 116 of the frame 110). In other embodiments, one or more of the prongs and shanks may be soldered, welded, or otherwise attached to the back surface 112 of the frame 110 at an edge 115, 116 or other location spaced from the recess 130. Any of the prongs 150) and shanks 160 may be previously articulated when provided to a user, or the user may opt to bend each of the wall-penetrating components to the user's liking.

As depicted, both the prongs 150 and shanks 160 extend to coplanar endpoints, and prongs 150) each include the same radius of curvature. In alternative embodiments, either of the prongs 150) may be offset from the other along the length of the respective edge 115, 116, such that one prong base 151 is nearer to the top edge 113 than the other. Furthermore, the base plate 110 may include one or more prongs in addition to the depicted pair of prongs 150): such additional prong(s) may feature the same or different radius of curvature, prong aspect ratio, outer end plane, length, or position alongside a side edge 115, 116 or back surface 112 of the base plate 110. The additional prongs may increase the weight hanging capabilities of the anchor but may result in additional damage to a wall surface on installation.

A load bearing projection 170) extends outward from the front surface 111 of the base plate 110. The load bearing projection 170) as depicted is a hook including a base 172. The loading bearing structure used on the plate 110) may instead include a button, a ledge, a shank, or any number of load bearing structures used to hang articles. Furthermore, an anchor 100 may include two or more load bearing structures aligned along a longitudinal axis, a latitudinal axis, or both. In other embodiments, the front face of the base plate may feature a layer of adhesive (described in further detail below). As can be seen in FIGS. 3 and 4, the projection 170) is disposed on the front face 111 such that the hook base 172 is located above the bottom edge 151a of the prong base 151. It should be appreciated, however, that the projection 170 may be placed at any desired location on the front face 111, though such placements may reduce the shear holding capacity of the anchor and limit the type of objects that may be mounted thereon.

Like the prongs 150) and shanks 160, the load bearing projection 170 can be formed from a monolithic piece of material that has been bent or otherwise articulated at select locations to form both base plate section 120) and the load bearing structure 170. As depicted, the hook 170) can be created by cutting (e.g., die stamping, laser cutting, etc.) a portion of the base plate 110 along a path to form a hook outline, which can then be folded in the direction of top edge 113 to form the projection.

Referring to FIG. 4, one method for attaching the wall anchor 100 to a substantially vertical surface is illustrated. In a first step, the upper plate section 122 is positioned at the desired location of the wall, optionally using the alignment groove 123. The anchor 100 is rotated about 45-60 degrees so that the outer end 152 of each curved prong 150 extends horizontally toward the wall, with the outer point 152 at a desired entry point. Force is applied in direction orthogonal to the front face 111 of the lower section 120, preferably at a location on the front face 111 between the curved prongs 150. The orthogonal force applied results in the anchor rotating about the upper edge 113 the outer end 152 of the prongs 250 penetrating the wallboard. Further rotation results in the remaining length of the prong being driven into the wallboard, followed by the insertion of the shanks 160 until the back surface 112 of the base plate 110 is generally flush with the wall. Optionally, the upper section 122 may then be removed along the line of weakness 127. Notably, the hook base 172 remains substantially aligned with or spaced above the insertion point of the prong ends 152 on the wall.

An object may be secured on the load bearing projection 170 before or after the anchor 100 has been inserted into the wall. Once an object is on the hook 170, it has a weight 180 that creates a force moment in the rotational direction away from the wall and downward. This translates to the force 181 that provides a bias or urging outwardly of the curved prong 150. This force also operates about the lowest edge 114 of the anchor 100, which functions as a pivot. The smaller the distance between the curved prong 150 and the pivot point, the greater the force 181 urging the anchor out of the wall. As can be seen with anchor 100, however, this force is distributed through the core of the wallboard above the curved prong 150. Having the force distributed above the prong 150 presents a considerable amount of material for the prong to tear through. Accordingly, the anchor 100 is less likely to dislodge from the wall or cause considerable damage to the wallboard.

For removal, the base plate may be lifted upwards by the lower section 121. The upper edge 113 (or 121, if upper section 122 is removed) naturally pivots upon itself and the anchor is dislodged as the outer ends 152 of the prongs 150 exit the wall. The lower section 120 may feature structures at the lower edge 113 to assist removal, such as a boss 190 that can be engaged with a screwdriver, key or other implement (see FIG. 9) or a hinged tab 192 that may be engaged by a human finger (see FIG. 10).

In presently preferred implementations, the anchor is made of a metal containing material, however, it can be appreciated that other suitable materials can be used. The anchor 100 is typically made from a resilient metal or metal alloy, such as stainless steel, titanium, cobalt-chromium alloy (such as manufactured by Elgiloy Specialty Metals, Elgin, IL), or a shape-memory alloy such as an alloy of nickel and titanium (e.g., Nitinol). Preferably, the anchor 100 is sufficiently resilient so that the shape when relaxed does not significantly change during the course of mounting an object. As another option, the anchor 100 could be made from any other resilient material known to one skilled in the art, such as a flexible polymer or composite material. Moreover, although the anchor 100 is specifically discussed as mountable on a wall of gypsum wallboard, it can be utilized with walls of other materials or to secure an object to something other than a wall.

Turning to FIGS. 5-8, another embodiment of a wall anchor 200 according to the present disclosure is depicted. The wall anchor 200 includes a base plate 210 including a front surface 211 opposing a back, wall-facing surface 212. A pair of upwardly curved prongs 250 extend from each side edge 215, 216 (see FIG. 6) in direction generally orthogonal to the back surface 212. The base 210 includes a lower section 220 and an upper section 222 connected at a line of weakness 226. The sections 220 and 222 are typically coplanar and include front surfaces residing in a plane "P". It is to be understood that many other aspects of anchor 200 may have similar form and function to those described with respect to anchor 100 and these need not be repeated.

In a slight departure from the anchor 100, the lower section 220 includes a fixed region 226, a taper 227, and a tab 228 that is pivotally moveable relative to the fixed region 228. The tab 228 features a smaller width 228a than that of the fixed region 228, allowing the tab 228 to flex about a hinge axis 229 within the taper 227. In alternative embodiments, the tab 228 may be coupled to the fixed region 227 by one or more hinge pins or living hinges.

To use anchor 200, a user selects the desired position on the wall to support an object. Next, force is applied in direction orthogonal to the front face 211 of the upper section 222. The orthogonal force applied results in the upper section 222 rotating about the upper edge 213 and continues until the outer end of the prongs 250 to penetrate the wallboard. Further rotation results in the remaining length of the prong 250 being driven into the wall until upper section 222 and the majority of fixed region 226 are flush with the vertical surface of the wall. The tab 228 pivots in a direction away from the wall along the hinge axis 229. The user then applies force orthogonal to the front face of the tab 229 to drive the shanks 260 into the wall.

The two-step process detailed above can help, under typical conditions, to ensure that the curved prongs 250 are rotated into the wall instead of directly pressed. Rotation of the prongs 250 into wall reduces the ability of the prong 250 to extract via the original insertion path. The flexing of the tab 228 inhibits the application of force over the entire front face 211 of the base plate 210, which may be sufficient to guide the user to properly rotate the upper section 222. Furthermore, the size of the fixed region 226 can subtly suggest the preferred surface for application of pressure.

Figure 11:
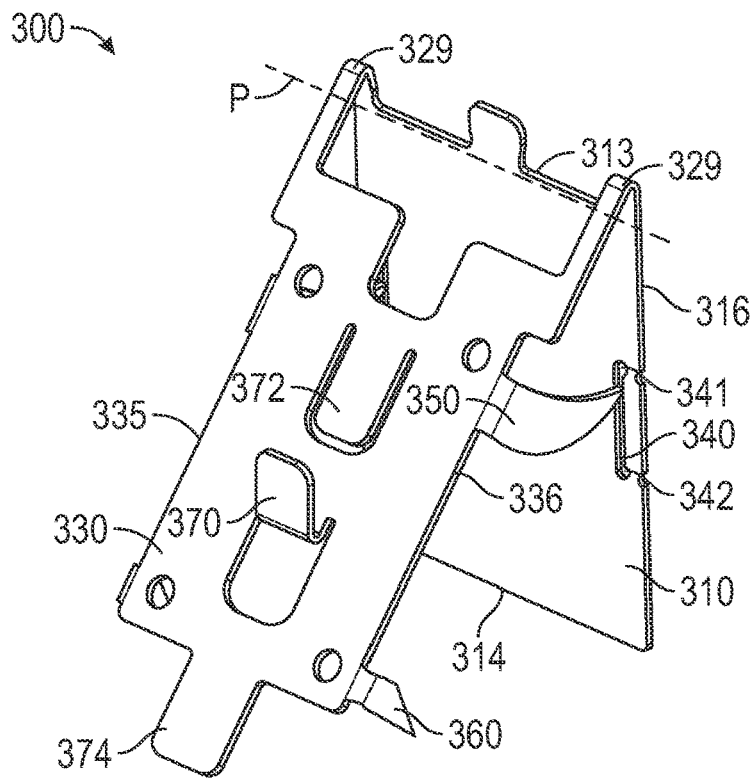
FIG. 11 illustrates a perspective view of a wall anchor assembly, according to yet another embodiment of the present disclosure.
Figures 12, 13:
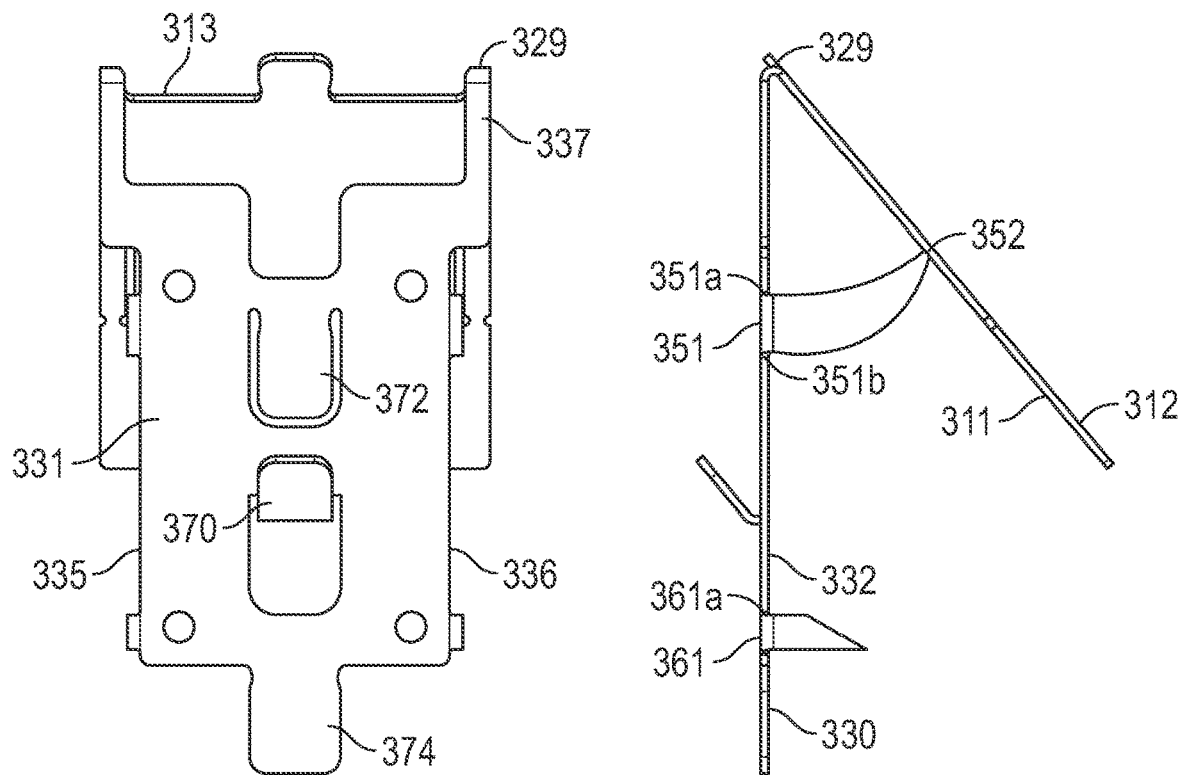
FIG. 12 is a side view of the wall anchor assembly of FIG. 11.
FIG. 13 is a front planar view of the wall anchor assembly of FIGS. 11-12.
Figure 14:
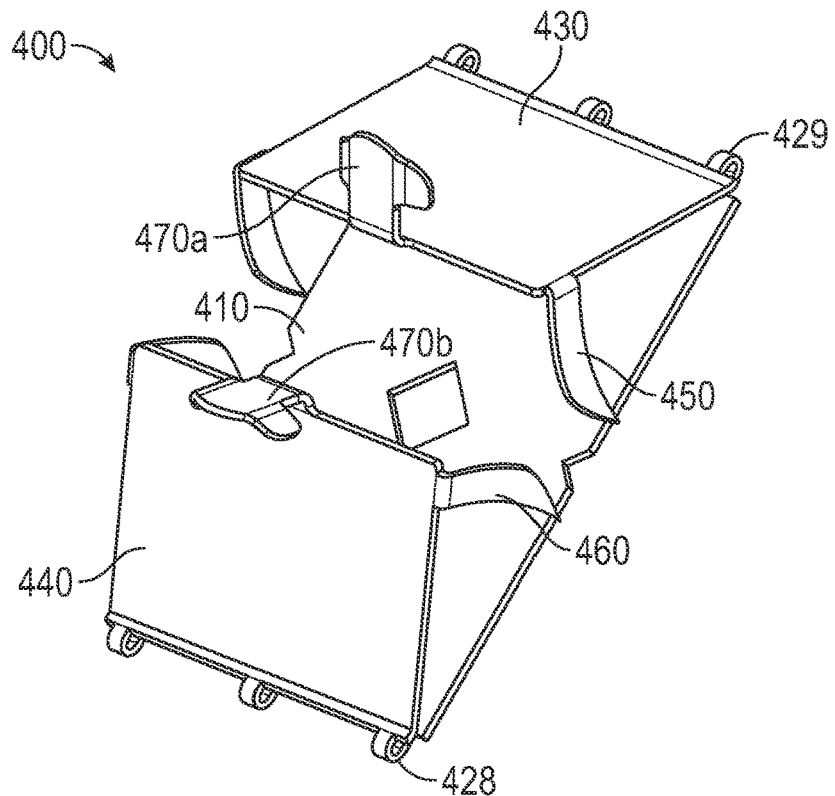
FIG. 14 illustrates a perspective view of a wall anchor assembly, according to yet another embodiment of the present disclosure.
Figure 15:
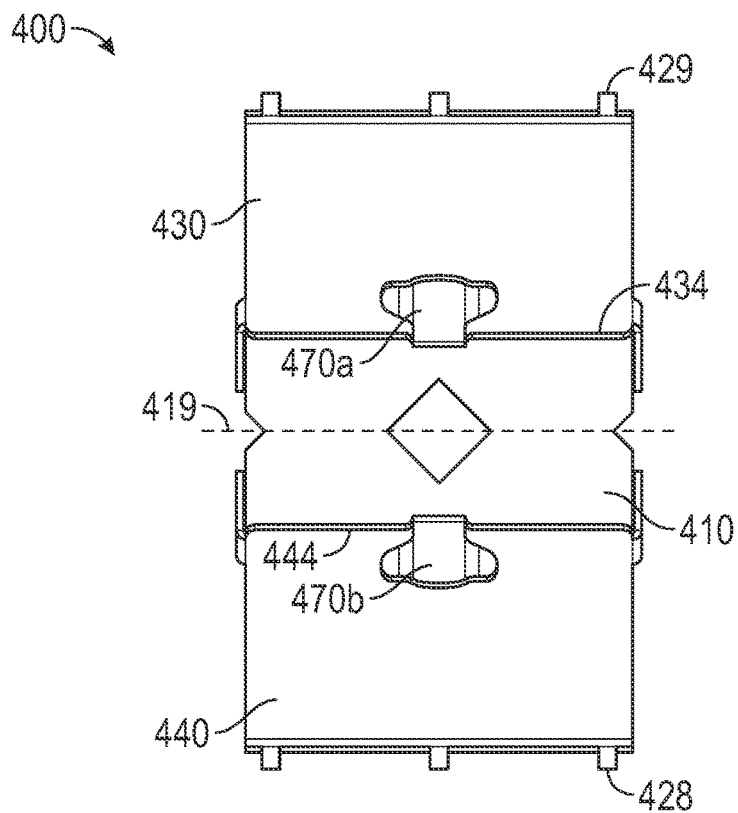
FIG. 15 is a front-planar view of the wall anchor assembly of FIG. 14.
Figure 16:
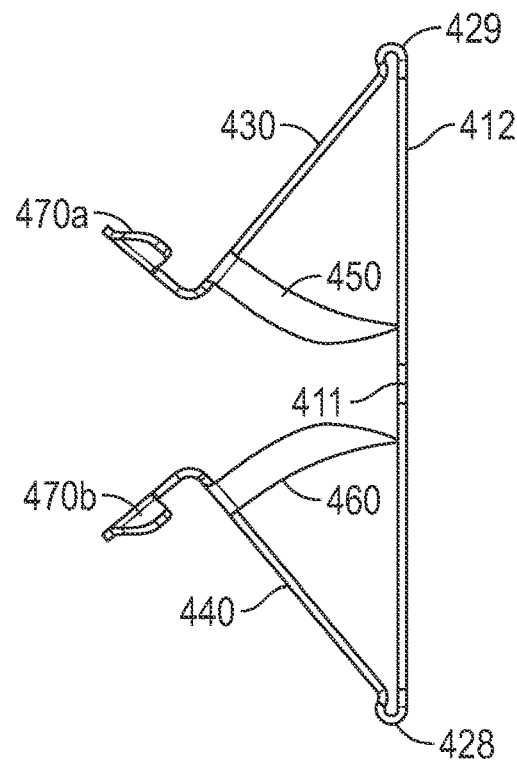
FIG. 16 is a side view of the wall anchor assembly of FIGS. 14-15.
Figure 17:
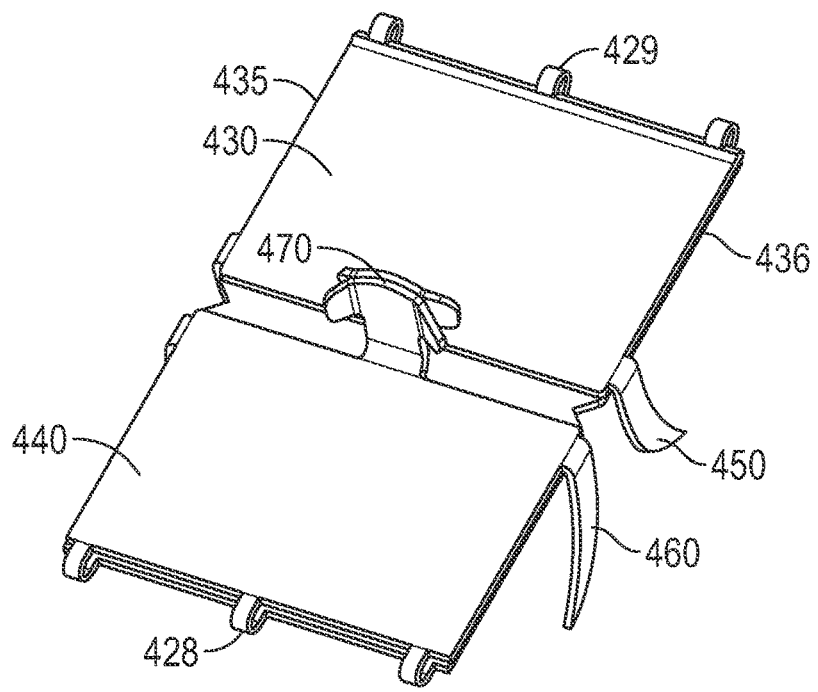
FIG. 17 is a perspective view of the wall anchor assembly of FIGS. 14-16 featuring the closing of the insert plates relative to the base plate.

Yet another embodiment of a wall anchor 300 according to the present disclosure is depicted in FIGS. 11-13. The wall anchor 300 includes a base plate 310 and an insert plate 330 pivotally coupled to the base plate 310 at hinge segments 329 adjacent the top edge 313 of the base plate 310. The base plate includes a front surface 311, a back surface 312, a bottom edge 314, and side edges 315, 316. Both the front 311 and back surfaces 312 are substantially planar, with the front surface 311 residing in a frame plane "P". It is to be understood that many other aspects of anchor 300 may have similar form and function to those described with respect to anchors 100 and 200, and these need not be repeated.

The base plate 310 includes two insertion guides 340 spaced across the width of the plate 310, with each insertion guide adjacent a side edge 315, 316. The insertion guides 340 include an aperture extending through the thickness of the plate 310. The aperture is dimensioned to allow a curved prong 350 on the insert plate 310 to reach the intended wall surface and continue its journey through the wallboard until the base 351 of the prong is generally parallel to the wall.

The insert plate 330 includes a front surface 331, a back surface 332, a top edge 333, and a bottom edge 334. A pair of legs 337 extends upwardly from the top edge 333 and couples the insert plate 330 to the hinge segment 329. The legs 337 feature a considerably smaller width than that of the insert plate body, allowing the leg 337 to flex about a hinge axis at the hinge segment 229. In alternative embodiments, the leg 337 may be coupled to the base plate 310 by one or more hinge pins or like structures.

The insert plate 330 includes a pair of curved prongs 350, each extending from one of the side edges 315, 316, and a pair of linear shanks 360 adjacent to the distal, bottom edge 314. The top edge 351$a$ of the prong base 351 is spaced from the hinge segment 329 at a distance equal to or less than the distance between the upper boundary 341 of the guide 340 and the hinge segment 329. This spacing can ensure the curved prong 350 enjoys a full, unimpeded path of travel through the aperture during use. Further, the hinge segment 229 can be located at the radial center of an arc defined by the curved prong, which can help ensure that the prongs 350 are inserted along an appropriate curved path.

The top 361$a$ of the shank base 361 is spaced from the lower edge 351$b$ of the prong base 351 at a distance greater than the distance between the lower boundary 342 of the guide 340 and the bottom edge 314 of the base plate 310: ensuring that the shank 360 is received in the wall at location below or otherwise spaced from the base plate 310. In alternative implementations, the base plate 310 may feature another set of insertion guides for the shanks 360.

The insert plate 330 includes a deployed load bearing projection 370) and additional load bearing tabs 372, 374 that a maintained in coplanar relation with the insert plate plane "I". The wall anchor may also be provided to a user with all load bearing structures 370, 372, 374 as tabs maintained in the plane "I", allowing the user to choose the location of the deployed load bearing structure by bending or otherwise articulating one or more of the tabs in the direction of top edge 313. Once bent to the desired orientation, the tab may serve as a hook or other load bearing structure for mounting the desired object. In some embodiments, some or all of the tab or load bearing projection may be removable by a user before or after deployment.

A back surface 310 of the base plate 310 can include an adhesive construction for temporarily securing the insert plate 330 to a wall surface. For example, the back surface may be coupled to a Command™ Adhesive Strip or a Command™ Picture Hanging Strip, both available from 3M Company. In some embodiments, the adhesive construction can include a pressure sensitive adhesive and a backing, while in other embodiments the adhesive construction includes only a continuous or discontinuous layer of pressure sensitive adhesive. A general description of useful pressure sensitive adhesives may be found in the Encyclopedia of Polymer Science and Engineering, Vol. 13. Wiley-Interscience Publishers (New York, 1988). Additional description of useful pressure-sensitive adhesives may be found in the Encyclopedia of Polymer Science and Technology. Vol. 1. Interscience Publishers (New York. 1964). Pressure sensitive adhesive compositions are well known to those of ordinary skill in the art to possess properties including the following: (1) tack. (2) adherence with no more than finger pressure. (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Suitable PSAs may be based on crosslinked or non-crosslinked (meth) acrylics, rubbers, thermoplastic elastomers, silicones, polyurethanes, and the like, and may include tackifiers in order to provide the desired tac, as well as other additives. In some embodiments, the PSA is based on a (meth)acrylic PSA or at least one poly(meth)acrylate, where (meth)acrylate refers to both acrylate and methacrylate groups. In some embodiments, the PSA is an olefin block copolymer-based adhesive.

The adhesive construction used on the insert plate 330 maybe peelable or stretch releasable. In embodiments featuring a stretch releasable construction, the construction can be removed from a surface by stretching it at an angle of less than 35°. In embodiments featuring a peel-releasable construction, the adhesive can be removed from a wall surface by stretching it an angle of 35° or greater. In some embodiments, the releasable adhesive may be removed by a combination of stretch and peel-release mechanisms.

An insert plate 330 featuring one or more stretch release adhesive constructions can include, for example, any of the adhesives and constructions described in any of the following patents: U.S. Pat. No. 5,516,581 (Kreckel et al.); U.S. Pat. No. 6,231,962 (Bries et al.): U.S. Pat. No. 7,078,093 (Sheridan et al.): U.S. Pat. No. 6,395,389 (Lühmann et al.); and US Patent Publication No. 2016/0068722 (Schmitz-Stapela et al.), all of which are incorporated by reference herein in their entirety.

An insert 350 featuring one or more peelable adhesive constructions can include, for example, any of the adhesives and constructions described in any of the following patent applications: International Publication Nos. 2015/035556, 2015/035960. U.S. Patent Application No. 2015/034104, and PCT Application Nos. US2017/015163 and US2017/014733, all of which are incorporated herein in their entirety.

The adhesive construction may further include one or more release liners. The release liner can be, for example, on either or both of major surfaces of the adhesive layers. The release liner protects the adhesive during manufacturing, transit, and before use. When the user desires to use the adhesive construction, the user can peel or remove the release liner to expose the adhesive. Examples of suitable liners include paper. e.g., kraft paper, or polymeric films, e.g., polyethylene, polypropylene or polyester.

The use of a removable adhesive on the base plate 310 allows for a user to adjust the position of the base plate 310 before committing to the location of the anchor 300 or otherwise puncturing the wall. To use anchor assembly 300, a user first removes any release liner from the adhesive construction on the base plate 310. The base plate 310 is then placed at the desired location and secured to the wall surface using finger pressure in the direction of the wall. Once the user is satisfied with the location of the base plate 310, force is applied in direction orthogonal to the front face 331 of the insert plate 330. The orthogonal force applied results in the anchor rotating about the hinge segment 329 and the outer end 352 of the prongs 350 penetrating the wallboard. Further rotation results in the remaining length of the prongs 350 being driven into the wallboard, followed by the insertion of the shanks 360 until the back surface 332 of the insert plate 330 is generally flush with the front surface 311 of the base plate 310.

Turning to FIGS. 14-17, another pivotable wall anchor assembly 400 is depicted. The wall anchor assembly includes a base plate 410) pivotally coupled to two insert plates at opposing hinge segment 428 and 429: upper insert plate 430) and lower insert plate 440. Each insert plate 430, 440 includes a pair of curved prongs 450, 460, respectively. It is to be understood that many other aspects of anchor 400 may have similar form and function to those described with respect to anchors 100 and 200, and these need not be repeated.

The upper insert plate 430) includes prongs 450) curving in the direction of hinge segment 429. The prongs 450) are located on the side edges 435, 436 of the upper plate 430 at a location near the distal edge 434 of the plate. The prongs 450 are spaced across the distal edge 434 such that the distance between the prongs is greater than the width of the base plate 410. In other embodiments, the base plate may feature guides similar to those of wall anchor assembly 300, with guides spaced to receive the prongs 450. The distal edge 434 also includes an upper segment 470a of a load bearing projection 470. The distance between the hinge segment 429 and the distal edge 434 is approximately equal to the distance between the hinge segment 429 and the latitudinal center axis 419 of the base plate 410.

The lower insert plate 440) includes prongs 460 curving in the direction of hinge segment 228, or downward relative to the prongs 450. The prongs 460 are located on the side edges 445, 446 of the lower plate 440) at a location near the distal edge 444 of the plate. The prongs 460) are spaced across the distal edge 444 such that the distance between the prongs is greater than the width of the base plate 410. The distal edge 444 also includes a lower segment 470b of a load bearing projection 470). The distance between the hinge segment 428 and the distal edge 444 is approximately equal to or less than the distance between the hinge segment 428 and the latitudinal center axis 419 of the base plate 410.

Due in part to the existence of two sets of curved prongs 450, 460, the wall anchor assembly may be secured to the wall with hinge segment 428, 429 oriented either vertically or horizontally. The dual orientation can allow a user to adapt to various space constraints where a vertical orientation may not be tenable. The back surface 412 of the base plate 410 may also feature a removable adhesive construction, similar to base plate 310. The wall anchor assembly 400 can also be used to produce faint markings on the wall with prong outer ends 452, 462, allowing a user to judge position and orientation of the assembly on the wall surface without fully committing to insert the prongs 450, 460. Once a commitment has been made, the user may rotate both the upper and lower insert plates to insert the prongs 450, 460 until the insert plates 430, 440 are generally flush with the base plate 410 and the loading bearing segments 470a. 470b combine to provide a load bearing structure 470.

While depicted as having two insert plates 430, 440, the assembly 400 may features three or more insert plates pivotably coupled to base plate 410. The additional insert plates may be arranged in rows, columns, grids, or radial arrays, as some non-limiting examples. Some or all the additional insert plates can be arranged in opposing pairs: in other embodiments some or all may feature a discrete orientation with respect to the other plates. Some or all the additional insert plates may include load bearing segments that combine to form a load bearing structure, including in combination with a load bearing segment on the base plate.

Figure 18:
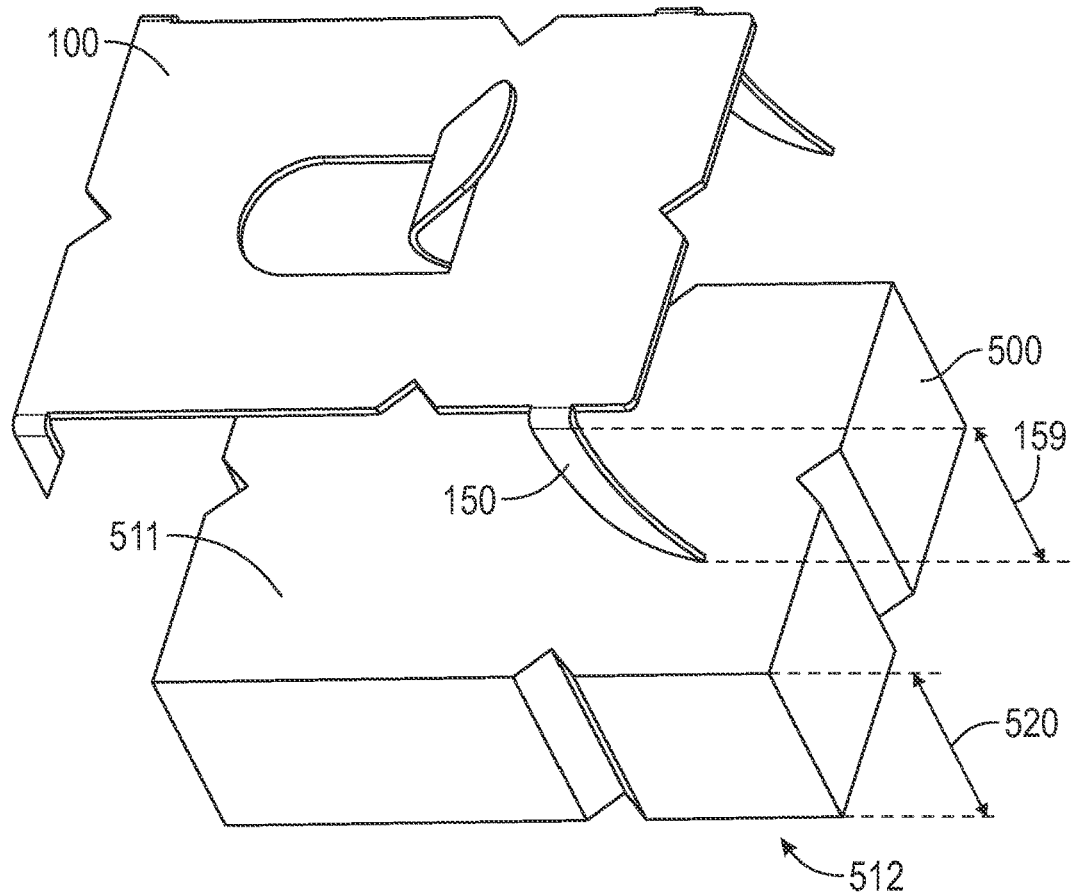
FIG. 18 is an exploded, perspective view of a wall anchor assembly according to yet another embodiment of the present disclosure.
Figure 19:
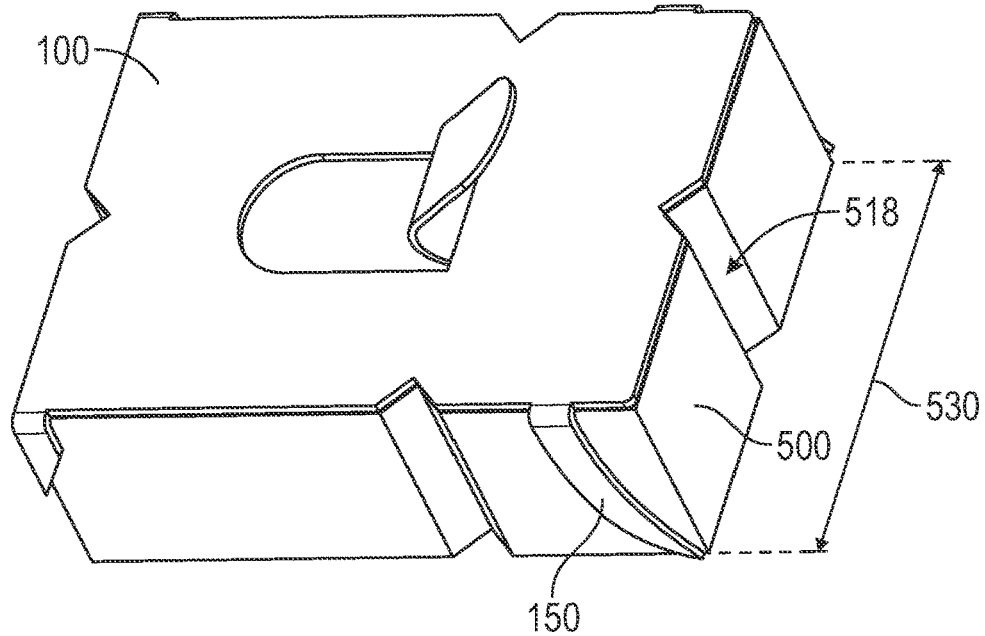
FIG. 19 is a perspective, assembled view of the wall anchor assembly of FIG. 18.

Another solution allowing for temporary markings using the wall anchors described herein is depicted in FIGS. 18 and 19. A wall anchor according to the present disclosure like wall anchor 100 may be provided with a pillow 500. The pillow 500 has an initial thickness 520 that is related to the base to end length 159 of a curved prong 150; the thickness 520 can be less than, equal, or greater than the end length 159 depending on the compressibility of the pillow 500. The width 530 of the pillow is typically configured to be equal to or less than the spacing width between prongs 150, allowing the prongs 150 to straddle the pillow and the back surface of the anchor to abut the front surface 511 of the pillow 500 during use. In other implementations, the width 530 may be greater than the spacing between prongs 150, with the pillow 500 compressible in the width direction or including apertures to receive the prongs 150. The back surface 512 of the pillow 500 may be provided with an adhesive construction, as described above.

The pillow 500 may include a compressible material that reduces in volume upon application of light finger pressure (e.g., 0.2 to 1.5 MPa). The ratio of the compressed volume/ initial volume (i.e., compressibility) will vary depending on the compressible material used. As used herein, compressible materials can include elastic and/or inelastic materials, depending on whether the material substantially rebounds after removal of application forces. The material can include any components that permit it to have the desired properties. Exemplary materials include foams (e.g., polymeric foams including, for example, cellulose foams, glass foams, polymeric foams, and combinations thereof), sponges, nonwoven fabrics, glass fibers (e.g., glass wool), ceramic fibers, cotton fibers, cellulose fibers, felt, rubber, woven mats, nonwoven mats, scrims, and combinations thereof. In other embodiments, the pillow can be plastic, metal, composite, or any other material or materials capable of being manufactured to the desired specifications. The pillow 500 may be a single continuous layer of material or may include multiple materials arranged in one or more layers.

The pillow 500 may also be collapsible, in that the deformation through the thickness in the direction of the wall is substantially permanent. Suitable collapsible materials include corrugated cardboard, collapsible foam, and other material including at least partially destructible voids. The pillow can also feature one or more biasing elements including, but not limited to, deflected beams, leaf springs, flat springs, hinged springs, compression springs (e.g., standard, conical, etc.), torsion springs (e.g., single, double, etc.), extension springs, barrel springs, and the like.

The use of the pillow 500 allows for a user to adjust the position of the wall anchor the before committing to the location of the anchor 500 or otherwise puncturing the wall, as the thickness acts as a spacer between prong body and the wallboard. To use pillow 500, a user first removes any release liner from the adhesive construction, if present. The pillow 500 and anchor 100 are then placed at the desired location and secured to the wall surface using finger pressure (or its rough equivalent) in the direction of the wall. Once the user is satisfied with the location of the pillow 500, light finger pressure is applied to the front face 111, which causes the pillow 500 to compress and the outer ends 152 of the prongs 150 to pierce the wall board. The user may then separate the anchor from the pillow and remove the pillow from the wall if adhesively secured.

A wall anchor 1000 according to another embodiment of the present disclosure is depicted in FIGS. 20-22. Unless specifically noted, the considerations and elements of anchor 1000 are the same as anchor 100 and need not be repeated here. The wall anchor 1000 includes a base plate 1010 presenting a generally rectangular shape (as seen in FIG. 22). The base plate 1010 includes a front surface 1011 opposing a back, wall-facing surface 1012, a top edge 1013, a bottom edge 1014, and opposing side edges 1015, 1016 connecting the top and bottom edges 1013, 1014 to define an outer plate perimeter. A pair of downwardly curved prongs 1050 extend from each side edge 1015, 1016 in direction generally orthogonal to the back surface 1012. The prongs 1050 extend to an outer end that can be tapered to case insertion when pressed into wall board. The wall anchor 1000 (or a plurality of wall anchors 1000) may also be pivotally coupled to a base plate (not shown), as described above.

The insertion and removal methods for wall anchor 1000 (and other anchors featuring downwardly curved prongs) is essentially the inverse of the method depicted in FIG. 4, in that the anchor is rotated about an axis nearer the bottom edge 1013 to insert and disengage prongs 1050.

Figure 23:
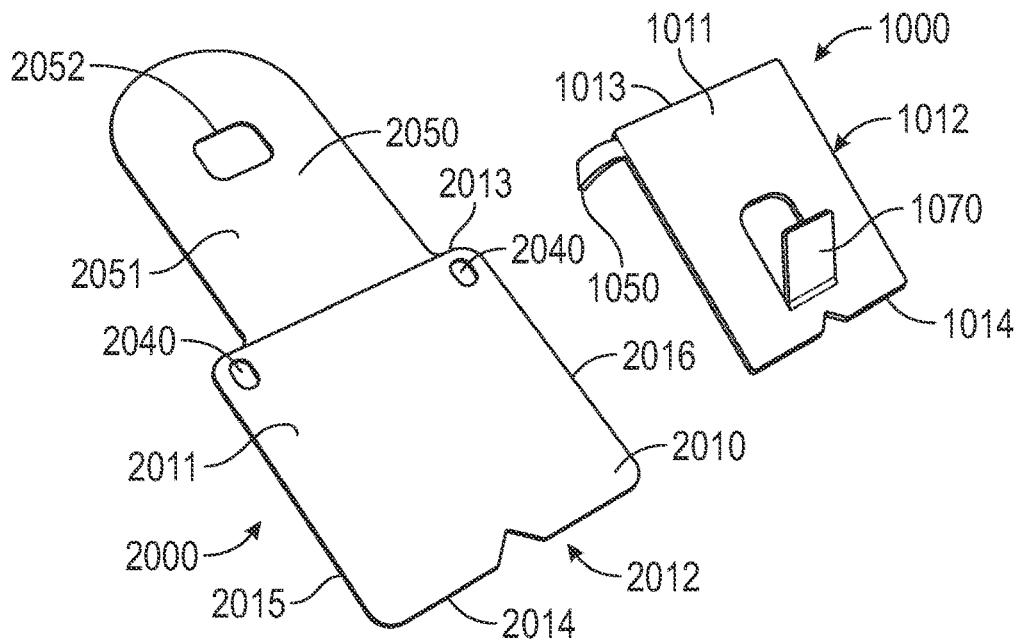
FIG. 23 is a front, perspective view of a removal assistance kit including a removal strip and a wall anchor according to one embodiment of the present disclosure.
Figure 24:
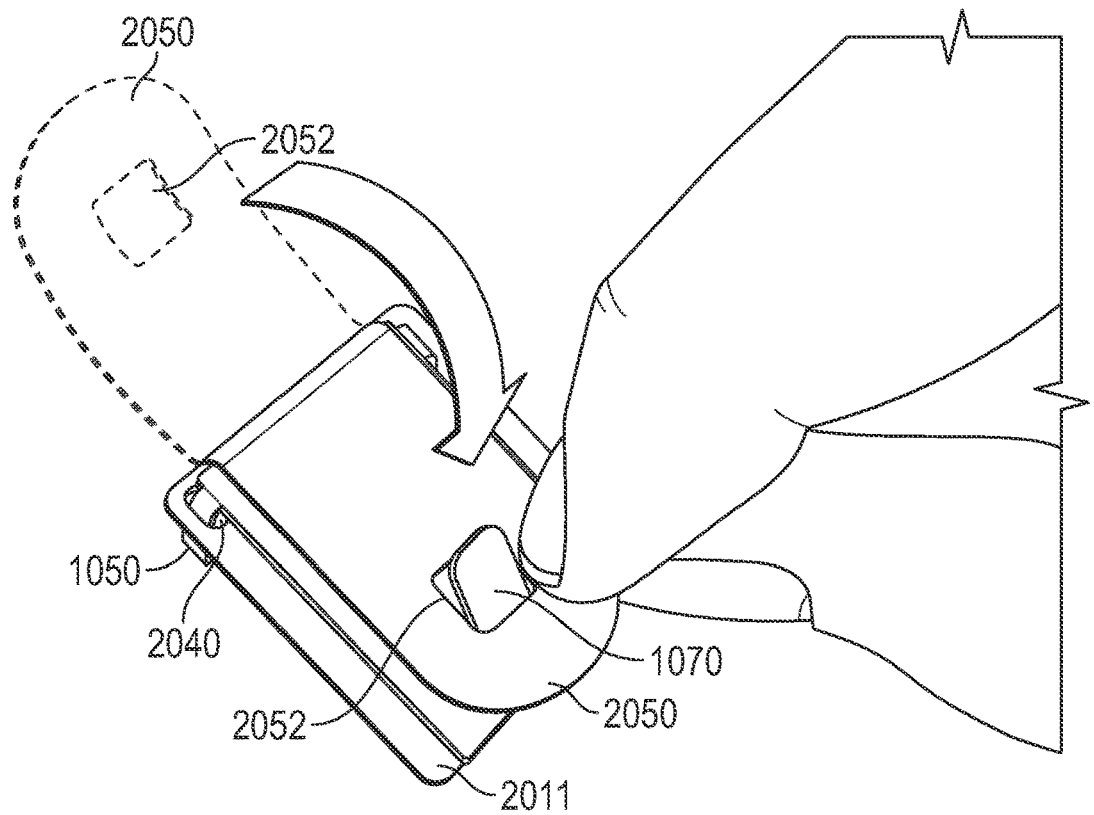
FIG. 24 is a perspective view of a tab of the removal strip being secured to the anchor.
Figure 25:
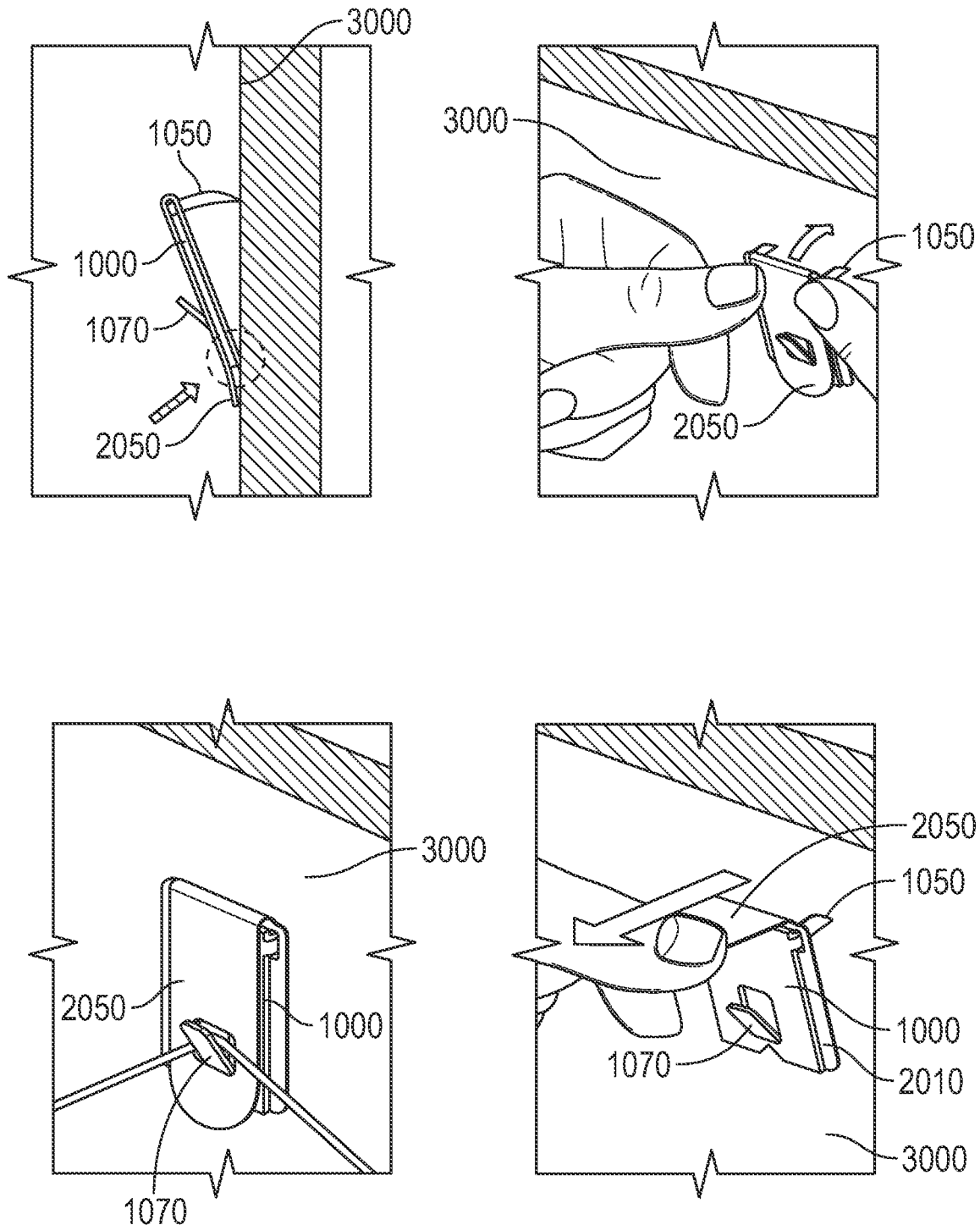
FIG. 25 is a perspective view of the assembled kit of FIG. 24 being removed from a mounting surface.

Any of the wall anchors and assemblies describe above may be provided in a kit with other anchors of the same or different size, as well as one or more pillows and/or other placement tools. The kit may further include a removal strip 2000 of the type depicted with anchor 1000 in FIGS. 23-25. The removal strip 2000 is designed to be positioned between the anchor 1000 or anchor assembly and a mounting surface. The removal strip 2000 includes a wall-facing portion 2010 and a tab 2050. The wall-facing portion 2010 includes a front surface 2011, a back surface 2012, a top edge 2013, a bottom edge 2014, and side edges 2015, 2016. The front surface 2011 may include an adhesive, typically protected by a release liner until use (not shown), for securing the removal strip to the rear surface 1012 of the anchor 1000.

The wall-facing portion 2010 includes two insertion guides 2040 spaced across its width, with each insertion guide adjacent a side edge 2015, 2016. The insertion guides 2040 include an aperture extending through the thickness of the removal strip 2000. The aperture is dimensioned to receive a curved prong 1050 on from the anchor 1000 to reach the intended mounting surface. While two insertion guides 2040 are depicted, one skilled in the art will appreciate that the removal strip 2000 can have a number of insertion guides corresponding to the number of prongs and/or shanks on a mating wall anchor. In addition to the insertion guides 2040, the wall-facing portion can include an alignment notch 2042 on the bottom edge 2013 to aid in position of the anchor 1000 on the front surface 2013.

The tab 2050 extends from top edge 2013 of the wall-facing portion 2010, and typically includes a width less than the width of the wall facing-portion as measured between side edges 2015 and 2016. The tab 2050 includes a front surface 2051 and is foldable along a bending axis at or adjacent the top edge 2013 of the wall-facing portion 2010. The front surface 2051 may include an adhesive, typically protected by a release liner until use (not shown), for securing the tab 2050 to the front surface 1011 of the anchor 1000. The tab 2050 further includes an aperture 2054 dimensioned to receive the load bearing structure 1070 when the tab 2050 is folded over the bending axis and positioned adjacent the front face 1011 of the anchor 1000. Accordingly, the length of the tab 2050 is typically commensurate with or greater than the length of the wall-facing portion 2010 as measured between the top and bottom edges 2013, 2014.

To use the removal strip 2000 in cooperation with the anchor 1000 (or other anchors and assemblies of the present disclosure), the user first removes any release liner from the front surface 2011 of the wall-facing portion 2010. The prongs 1050 are inserted through the guides 2040 and the anchor 1000 is aligned on the front surface of the wall-facing portion 2010 such that the bottom edges 1014, 2014 are generally in parallel. The front face 2011 is then adhered or brought adjacent to the rear surface 1012 of the anchor 1000. The tab 2050 is then folded about the bending axis and secured to the front face of the wall anchor 1000. The assembled film 2000 and anchor 1000 can then be secured to the wall and use to mount an object as set out above. The film 2000 remains with the anchor 1000 while the object is mounted on the load bearing structure 1070.

Once the user wishes to remove the anchor 1000 from the mounting surface, the tab 2050 may be disengaged from the front surface 1011. The tab 2050 may then be pulled in a direction generally orthogonal to the front surface 1011 to disengage the prongs 1050 from the mounting surface.

The removal strip can possess a single layer or a multi-layer construction. Materials forming the removal strip can include paper, natural or synthetic polymer films, nonwovens made from natural and/or synthetic fibers and combinations thereof, fabric reinforced polymer films, fiber or yarn reinforced polymer films or nonwovens, fabrics such as woven fabric formed of threads of synthetic or natural materials. The removal strip may also be formed of metal, metallized polymer films, or ceramic sheet materials in combination with at least one of the above. In some embodiments, the removal strip is a multilayered film having two or more layers: in some such embodiments the layers are laminated. For example, the removal strip can be formed of a foam, a film, or a combination thereof with any suitable thickness, composition, and opaqueness or clarity. The removal strip may be die-cut or laser cut from a unitary piece of material, or the tab may be joined to wall-facing portion via adhesive or mechanical bonding.

The wall anchors and assemblies of the present disclosure can be used even in instances where the object does not include a wire but instead includes a different backing hardware configuration. Exemplary backing hardware configurations include, but are not limited to, a "D"-ring, saw-tooth, key-hole hangers, etc.

The wall anchors of the present disclosure may be used to mount myriad items and objects to surfaces such as painted drywall, plaster, concrete, glass, ceramic, fiberglass, metal or plastic. Items that can be mounted include, but are not limited to, wall hangings, organizers, holders, baskets, containers, decorations (e.g., holiday decorations), calendars, posters, dispensers, wire clips, guitars, floating shelves, curtain rods, heavy-duty hooks, brackets, wall sconces, and carrying handles.

EMBODIMENTS

1. A wall anchor comprising: a base plate including opposing front and back surfaces, a top edge, a bottom edge and two opposing side edges: and a curved prong having a base, wherein the prong extends outwardly along an arc to a wall-penetrating outer end, and wherein the base of the prong is integral with one of the opposing side edges.

2 The wall anchor of embodiment 1, wherein the base of the prong is adjacent the top edge.

3. The wall anchor of embodiments 1 and 2, and further comprising a hook, and wherein the bottom of the hook is disposed in a plane parallel to or above a top edge of the base of the prong.

4. The wall anchor of embodiments 1-3, wherein the base of the prong has a height measured along the side edge and a thickness measured along the top edge, and wherein the height is a least twice the thickness.

5. The wall anchor of embodiment 4, wherein the height is at least three times the thickness.

6. The wall anchor of embodiment 5, wherein the height is at least four times the thickness.

7. The wall anchor of embodiments 1-6, wherein the base plate includes a fixed region and a tab, and wherein the tab is pivotable relative to the fixed region.

8. The wall anchor of any one of embodiments 1-7, wherein the prong curves upwardly in the direction of the top edge.

9. The wall anchor of any one of embodiments 1-8 and further including a second curved prong extending outwardly along an arc to an outer end.

10. The wall anchor of embodiment 8, wherein the outer end of the first prong and the outer end of the second prong are coplanar.

11. The wall anchor of embodiment 10, wherein each prong curves upwardly in the direction of the top edge of the base plate.

12. The mounting apparatus of any one of embodiments 1-11, and further comprising a pillow.

13. The wall anchor of embodiment 12, wherein the pillow comprises a compressible material.

14. The mounting apparatus of embodiments 12-13, wherein the sacrificial pillow has an initial thickness, and wherein the pillow thickness is greater than a length of the prong.

15. The wall anchor of any one of embodiments 12-14, wherein a major surface of the pillow includes an adhesive construction.

16. The wall anchor of embodiment 1, and further including a shank disposed adjacent the bottom edge.

17. The wall anchor of embodiment 16, wherein the base of the shank is colinear with the base of the prong.

18. A wall anchor assembly comprising: a base plate a first insertion plate pivotally coupled to the base plate and including a proximal edge, a distal edge, and opposing side edges, the insertion plate further including a curved prong having a base, wherein the prong extends outwardly along an arc to a wall-penetrating outer end, and wherein the base of the prong is coincident with one of the opposing side edges.

19. The wall anchor assembly of embodiment 18, wherein the base plate includes opposing first and second major surfaces, and wherein the first major surface includes an adhesive construction disposed thereon.

20. The wall anchor assembly of embodiment 18, wherein the base plate is pivotally coupled to the insertion plate at a first hinge segment.

21. The wall anchor assembly of embodiment 20, wherein the first hinge segment is disposed proximate a top edge of the base plate and a proximal edge of the insertion plate.

22. The wall anchor assembly of embodiments 18-21, wherein the base plate includes a guide aperture dimensioned for receipt of the prong.

23. The wall anchor assembly of embodiment 18-22, wherein the base of the prong has a height measured along the side edge and a thickness measured along the top edge, and wherein the height is a least twice the thickness.

24. The wall anchor assembly of embodiment 23, wherein the height is at least three times the thickness.

25. The wall anchor assembly of embodiment 18, wherein the prong curves upwardly in the direction of the proximal edge.

26. The wall anchor assembly of embodiment 18 and further including a second curved prong extending outwardly along an arc to an outer end.

27. The wall anchor assembly of embodiment 26, wherein the outer end of the first prong and the outer end of the second prong are coplanar.

28. The wall anchor assembly of embodiment 26, wherein the base of the second prong is integral with one of the opposing side edges.

29. The wall anchor assembly of embodiment 28, wherein the base of the second prong is integral with the side edge opposite the side edge integral with the first prong base.

30. The wall anchor assembly of embodiments 18-29 and further comprising a second insertion plate pivotally coupled to the base plate and including a proximal edge, a distal edge, and opposing side edges, the second insertion plate further including a second curved prong having a base, wherein the prong extends outwardly along an arc to a wall-penetrating outer end, and wherein the base of the prong is coincident with one of the opposing side edges of the second insertion plate.

31. The wall anchor assembly of embodiment 30, and wherein the base plate is pivotally coupled to the second insertion plate at a second hinge segment, and where second hinge segment is disposed adjacent the bottom edge of the base plate opposite the first hinge segment.

32. The wall anchor assembly of embodiment 31, wherein the second hinge segment is disposed proximate a bottom edge of the base plate and a proximal edge of the second insertion plate.

33. The wall anchor assembly of embodiments 31-32, wherein the second curved prong curves downwardly toward the second hinge segment.

34. The wall anchor assembly of any one of embodiments 31-33, wherein each insertion plate is rotatable in the direction of the base plate to insert the curved prongs into a wall material.

35. The wall anchor assembly of embodiments 31-34, wherein the assembly is adjustable between an open state and a closed state, and wherein the first and second insertion plates include rear surfaces residing in planes substantially parallel to a front surface of the base plate in the closed state.

The patents, patent documents, and patent applications cited herein are incorporated by reference in their entirety as if each were individually incorporated by reference. It will be apparent to those of ordinary skill in the art that various changes and modifications may be made without deviating from the inventing concepts set from above. Thus, the scope of the present disclosure should not be limited to the structures described herein. Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following embodiments and equivalents thereof.

We claim:

1. A wall anchor comprising:
    a base plate including opposing front and back surfaces, a top edge, a bottom edge and two opposing side edges; and
    a pair of curved prongs bent backward from the side edges of the base plate, with a first prong having a base coincident and integral with a first of the side edges and a second prong having a base coincident and integral with the second of side edges, wherein each prong extends outwardly along an arc to a wall-penetrating outer end and has a thickness measured between two flat side surfaces,
    wherein the wall-penetrating outer end of each prong is tapered to a triangular cross-sectional shape,
    wherein the base of each prong has a height, and wherein the height is a least three times the prong thickness,
    and wherein the base of each prong is substantially coplanar with the front surface of the base plate.

2. The wall anchor of claim 1, wherein each base of the first and second prong is adjacent the top edge.

3. The wall anchor of claim 1, and further comprising a hook, and wherein the bottom of the hook is disposed in a plane parallel to or above a top edge of the base of the prong.

4. The wall anchor of claim 1, wherein the height is a least four times the thickness.

5. The wall anchor of claim 4, wherein the height is at least five times the thickness.

6. The wall anchor of claim 1, wherein the first prong curves upwardly in the direction of the top edge.

7. The wall anchor of claim 1 wherein each of the first and second prongs curves downwardly in a direction of the bottom edge.

8. The wall anchor of claim 1 wherein the wall-penetrating outer end of the first prong and the outer end of the second prong are coplanar.

9. The wall anchor of claim 8, wherein each prong curves upwardly in the direction of the top edge of the base plate.

10. The wall anchor of claim 1, and further including a shank disposed adjacent the bottom edge, and wherein the base of the shank is colinear with the base of the prong.

11. A wall anchor assembly comprising:
    a base plate;
    a first insertion plate pivotally coupled to the base plate and including a proximal edge, a distal edge, and opposing side edges, the insertion plate further including:
        a pair of curved prongs bent backward from the side edges of the base plate, with a first prong having a base coincident and integral with a first of the side edges and a second prong having a base coincident and integral with the second of side edges, wherein each prong extends outwardly along an arc to a wall-penetrating outer end and has a thickness measured between two flat side surfaces,
        wherein the wall-penetrating outer end of each prong is tapered to a triangular cross-sectional shape,
        wherein the base of each prong has a height,
        wherein the height is a least three times the prong thickness, and
        wherein the base of each prong is substantially coplanar with a front surface of the base plate.

12. The wall anchor assembly of claim 11, wherein the base plate includes opposing first and second major surfaces, and wherein the first major surface includes an adhesive construction disposed thereon.

13. The wall anchor assembly of claim 11, wherein the base plate is pivotally coupled to the insertion plate at a first hinge segment.

14. The wall anchor assembly of claim 11, wherein the base plate includes a guide aperture dimensioned for receipt of the prong.

15. The wall anchor assembly of claim 11 and further comprising a second insertion plate pivotally coupled to the base plate and including a proximal edge, a distal edge, and opposing side edges, the second insertion plate further including a second pair of curved prongs bent backward from the side edges of the second insertion plate, with a third prong having a base coincident and integral with a first of the side edges and a fourth prong having a base coincident and integral with the second of side edges, wherein each prong of the second pair extends outwardly along an arc to a wall-penetrating outer end and has a thickness measured between two flat side surfaces, and
    wherein the base of each prong of the second pair has a height, and wherein the height is a least three times the prong thickness.

16. The wall anchor assembly of claim 15, wherein the assembly is adjustable between an open state and a closed state, and wherein the first and second insertion plates include rear surfaces residing in planes substantially parallel to a front surface of the base plate in the closed state.

17. A kit for mounting an object, the kit comprising:
    a wall anchor according to claim 1,
    at least one of a) a compressible pillow, wherein the pillow has an initial thickness, and wherein the pillow thickness is greater than a length of each of the first and the second prongs, and
    b) a removal strip, the removal strip including a tab and a wall-facing portion, the strip including insertion apertures for receipt of each of the first and second prongs.

18. The wall anchor of claim 17, wherein the tab is foldable about a bending axis adjacent a top edge of the wall-facing portion and includes an aperture for receipt of a load bearing structure on the wall anchor.

* * * * *